United States Patent
Cui et al.

(10) Patent No.: US 10,246,536 B2
(45) Date of Patent: Apr. 2, 2019

(54) FUNCTIONALIZED HIGHLY SYNDIOTACTIC POLYSTYRENE AND PREPARATION METHOD THEREOF

(71) Applicant: Changchun Institute of Applied Chemistry Chinese Academy of Sciences, Changchun (CN)

(72) Inventors: Dongmei Cui, Changchun (CN); Dongtao Liu, Changchun (CN); Zichuan Wang, Changchun (CN)

(73) Assignee: Changchun Institute of Applied Chemistry Chinese Academy of Sciences, Changchun (CN)

( * ) Notice: Subject to any disclaimer, the term of this patent is extended or adjusted under 35 U.S.C. 154(b) by 0 days.

(21) Appl. No.: 15/501,737

(22) PCT Filed: Aug. 13, 2015

(86) PCT No.: PCT/CN2015/086856
§ 371 (c)(1),
(2) Date: Feb. 3, 2017

(87) PCT Pub. No.: WO2016/023503
PCT Pub. Date: Feb. 18, 2016

(65) Prior Publication Data
US 2017/0335036 A1 Nov. 23, 2017

(30) Foreign Application Priority Data

Aug. 14, 2014 (CN) ............................ 2014 1 0401107
Aug. 14, 2014 (CN) ............................ 2014 1 0401108

(51) Int. Cl.
| | | |
|---|---|---|
| C08F 4/52 | (2006.01) |
| C08F 212/08 | (2006.01) |
| C08F 212/14 | (2006.01) |
| C08F 4/54 | (2006.01) |
| C08F 2/02 | (2006.01) |
| C08F 2/06 | (2006.01) |
| C08F 4/12 | (2006.01) |
| C08L 25/06 | (2006.01) |
| C08L 25/16 | (2006.01) |
| C08F 12/22 | (2006.01) |
| C08F 12/30 | (2006.01) |
| C08F 112/14 | (2006.01) |

(52) U.S. Cl.
CPC .............. *C08F 212/08* (2013.01); *C08F 2/02* (2013.01); *C08F 2/06* (2013.01); *C08F 4/12* (2013.01); *C08F 4/545* (2013.01); *C08F 12/22* (2013.01); *C08F 12/30* (2013.01); *C08F 112/14* (2013.01); *C08F 212/14* (2013.01); *C08L 25/06* (2013.01); *C08L 25/16* (2013.01)

(58) Field of Classification Search
CPC ....... C08F 4/545; C08F 212/08; C08F 212/14
See application file for complete search history.

(56) References Cited

U.S. PATENT DOCUMENTS

| 5,189,125 A | 2/1993 | Ishihara et al. |
| 6,486,272 B1 | 11/2002 | Inoue et al. |

FOREIGN PATENT DOCUMENTS

| JP | H03/109405 A | 5/1991 |
| JP | H05/310834 A | 11/1993 |
| JP | 2013/203879 A | 10/2013 |
| WO | WO-92/09641 | 6/1992 |

*Primary Examiner* — Caixia Lu
(74) *Attorney, Agent, or Firm* — Cesari and McKenna, LLP

(57) ABSTRACT

Compared to the prior art, this invention provides a functionalized highly syndiotactic polystyrene, comprising a repeating unit having a structure represented by formula (I), or comprising a repeating unit having a structure represented by formula (I) and a repeating unit having a structure represented by formula (II). It is indicated by the experimental results that the syndiotacticity selectivity of the highly syndiotactic polymer provided by this invention is no less than 90%, and the proportion of the repeating unit having a structure represented by formula (I) in the polymer may be arbitrarily adjusted and may be up to 100%. Meanwhile, the oxygen- or sulfur-containing groups in the polymer may increase the polarity of the highly syndiotactic polystyrene so as to increase the blendability of the highly syndiotactic polystyrene with other polymers.

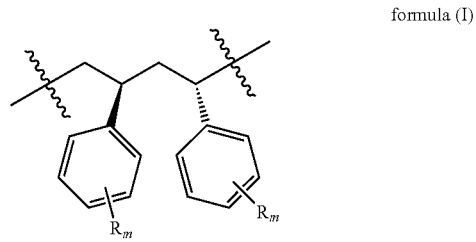

formula (I)

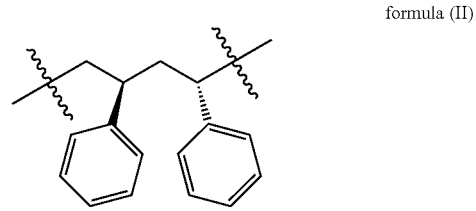

formula (II)

9 Claims, 3 Drawing Sheets

FUNCTIONALIZED HIGHLY SYNDIOTACTIC POLYSTYRENE AND PREPARATION METHOD THEREOF

CROSS REFERENCE TO RELATED APPLICATIONS

This application is the National Stage of International Application No. PCT/CN2015/086856, filed on Aug. 13, 2015, which claims the benefit of Chinese Application No. 201410401108.1, filed on Aug. 14, 2014, and Chinese Application No. 201410401107.7, filed on Aug. 14, 2014. The contents of all three applications are hereby incorporated by reference in their entirety.

FIELD OF THE INVENTION

This invention relates to the technical field of polymer preparation, and particularly to a functionalized highly syndiotactic polystyrene and the preparation method thereof.

BACKGROUND OF THE INVENTION

Highly syndiotactic polystyrene (sPS) was achieved for the first time by Idemitsu Kosan Corporation in Japan through catalytic polymerization by using a titaniummetallocene catalyst in 1986. The highly syndiotactic polystyrene has industrially become a highly attractive material due to properties such as a high melting point, a high crystallinity, a high elastic modulus, a low dielectric constant, a low loss factor, a good heat resistance, a good solvent resistance, or the like.

However, the highly syndiotactic polystyrene has a relatively large brittleness and has a critical disadvantage of lacking polar groups in the polymer when used as a material alone, which limits the application field of the highly syndiotactic polystyrene. Therefore, there are always problems to be solved by a large number of scientists and technologists to improve the brittleness of the highly syndiotactic polystyrene, to improve the polarity thereof, and to synthesize functionalized highly syndiotactic polystyrene.

However, polystyrene may be caused to be degraded in the process of modifying polystyrene. A functionalized group may be directly introduced to highly syndiotactic polystyrene by subjecting a functionalized styrene to a highly syndiotactic homopolymerization and then to a highly syndiotactic copolymerization with styrene, such that the problems of polymer degradation or the like which are caused by post-functionalization of the highly syndiotactic polystyrene are avoided. However, styrene containing a functionalized group will easily lose polymerization activity after coordinating a catalyst, and thus the homopolymerization and the copolymerization with styrene of functionalized styrene are also very difficult. In 1990, Kazuo Soga et al., studied the copolymerization of styrene with p-chlorostyrene, m-chlorostyrene, or p-bromostyrene using a Ziegler-Natta catalyst, and the results indicated that the copolymer obtained had a random structure. Later, the researching team of Jungahn Kim used a functionalized styrene protected by a large sterically-hindered group, which was 4-tert-butyldimethylsiloxy styrene, to perform copolymerization with styrene, but the copolymer obtained had a relatively low molecular weight. In 2002, professor T. C. Chung synthesized a copolymer of p-borane functionalized styrene and styrene using a mono-titanocene catalyst, wherein the insertion rate of the functionalized monomers was at most 32.2%.

SUMMARY OF THE INVENTION

In view of this, the technical problem to be solved by this invention is to provide a functionalized highly syndiotactic polystyrene and the preparation method thereof, wherein the insertion rate of the functionalized styrene monomers in the polymer may be arbitrarily adjusted to obtain a polymer with a high molecular weight.

This invention provides a functionalized highly syndiotactic polystyrene, comprising a repeating unit having a structure represented by formula (I), or comprising a repeating unit having a structure represented by formula (I) and a repeating unit having a structure represented by formula (II),

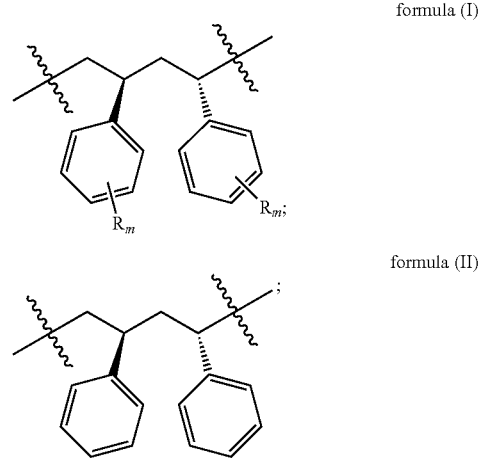

wherein in formula (I),

R is independently selected from a $C_{1-20}$ alkoxy group, a $C_{6-20}$ aryloxy group, a $C_{1-20}$ alkylthio group, a $C_{6-20}$ arylthio group, or a $C_{6-20}$ aryl group, and m is the number of substituent R and is independently selected from an integer from 1 to 5.

Preferably, R is independently selected from a $C_{2-10}$ alkoxy group, a $C_{7-10}$ aryloxy group, a $C_{2-10}$ alkylthio group, a $C_{7-10}$ arylthio group, or a $C_{7-10}$ aryl group.

Preferably, the functionalized highly syndiotactic polystyrene has a syndiotacticity of no less than 90% and the repeating unit represented by formula (I) has a mole fraction w wherein 0%<w≤100%.

Preferably, the functionalized highly syndiotactic polystyrene has a number average molecular weight of $1 \times 10^4$ to $300 \times 10^4$.

This invention also provides a preparation method of a functionalized highly syndiotactic polystyrene, comprising:

performing a reaction of a functionalized styrene or a reaction of styrene and a functionalized styrene under the action of a catalyst to obtain the functionalized highly syndiotactic polystyrene, wherein the highly syndiotactic polymer comprises a repeating unit having a structure represented by formula (I) or, comprises a repeating unit having a structure represented by formula (I) and a repeating unit having a structure represented formula (II):

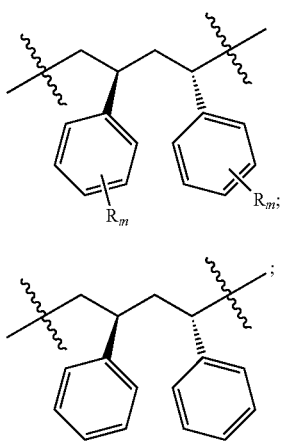

formula (I)

formula (II)

wherein the functionalized styrene has a structure represented by formula (III):

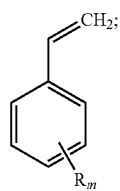

formula (III)

wherein in formula (I) and formula (III),

R is independently selected from a $C_{1-20}$ alkoxy group, a $C_{6-20}$ aryloxy group, a $C_{1-20}$ alkylthio group, a $C_{6-20}$ arylthio group, or a $C_{6-20}$ aryl group;

m is the number of substituent R and is independently selected from an integer from 1 to 5; and the catalyst comprises a rare earth complex, an organoboron compound, and an organoaluminum compound.

Preferably, the rare earth complex has a structure represented by formula (IV) or formula (V):

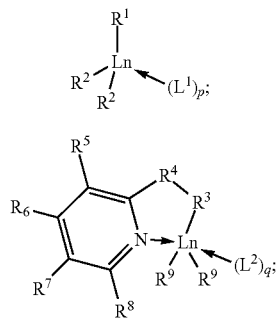

formula (IV)

formula (V)

wherein, $R^1$ is selected from any one of a cyclopentadienyl group and derivatives thereof, an indenyl group and derivatives thereof, or a fluorene group and derivatives thereof;

$R^2$ is selected from a $C_{1-10}$ alkyl group, a $C_{1-10}$ silyl group, a $C_{6-10}$ aminoaryl group, a $C_{1-10}$ silylamino group, a $C_{1-10}$ alkylamino group, a $C_{3-10}$ allyl group, or a borohydride group;

$L^1$ is a ligand selected from tetrahydrofuran, ethyl ether, ethylene glycol dimethyl ether, or toluene;

p is the number of $L^1$, wherein $0 \leq p \leq 2$;

$R^3$ is selected from any one of a cyclopentadienyl group and derivatives thereof, an indenyl group and derivatives thereof, or a fluorene group and derivatives thereof;

$R^4$ is selected from a methylene group, an ethylene group, or a dimethylsilyl group;

$R^5$, $R^6$, and $R^7$ are independently selected from hydrogen, a methyl group, an ethyl group, an isopropyl group, a tert-butyl group, or a phenyl group;

$R^8$ is selected from hydrogen, a methyl group, an ethyl group, an isopropyl group, a tert-butyl group, a phenyl group, a 2,6-dimethylphenyl group, a 4-methylphenyl group, a s-trimethylphenyl group, a 2,6-diisopropyl phenyl group, a 2,4,6-triisopropyl phenyl group, or a 2,6-di-tert-butyl phenyl group;

$R^9$ is selected from a $C_{1-10}$ alkyl group, a $C_{1-10}$ silyl group, a $C_{6-10}$ aminoaryl group, a $C_{1-10}$ silylamino group, a $C_{1-10}$ alkylamino group, a $C_{3-10}$ allyl group, or a borohydride group;

$L^2$ is a ligand selected from tetrahydrofuran, ethyl ether, ethylene glycol dimethyl ether, or toluene;

q is the number of $L^2$, wherein $0 \leq q \leq 2$; and

Ln is independently selected from Sc, Y, La, Ce, Pr, Nd, Pm, Sm, Eu, Gd, Tb, Dy, Ho, Er, Tm, Yb, or Lu.

Preferably, the organoboron compound is selected from $[Ph_3C][B(C_6F_5)_4]$, $[PhNMe_2H][BPh_4]$, $[NEt_3H][BPh_4]$, $[PhNMe_2H][B(C_6F_5)_4]$, or $B(C_6F_5)_3$.

Preferably, and the organoaluminum compound is selected from an alkyl aluminum, a hydrogenated alkyl aluminum, a halogenated alkyl aluminum, or an alumoxane.

Preferably, the organoaluminum compound is one or more selected from trimethyl aluminum, triethyl aluminum, tri-n-propyl aluminum, tri-n-butyl aluminum, triisopropyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyldibenzyl aluminum, ethyl di-p-tolyl aluminum, diethylbenzyl aluminum, dimethyl aluminum hydride, diethyl aluminum hydride, di-n-propyl aluminum hydride, di-n-butyl aluminum hydride, diisopropyl aluminum hydride, diisobutyl aluminum hydride, dipentyl aluminum hydride, dihexyl aluminum hydride, dicyclohexyl aluminum hydride, dioctyl aluminum hydride, diphenyl aluminum hydride, di-p-tolyl aluminum hydride, dibenzyl aluminum hydride, ethylbenzyl aluminum hydride, ethyl p-tolyl aluminum hydride, dimethyl aluminum chloride, diethyl aluminum chloride, di-n-propyl aluminum chloride, di-n-butyl aluminum chloride, diisopropyl aluminum chloride, diisobutyl aluminum chloride, dipentyl aluminum chloride, dihexyl aluminum chloride, dicyclohexyl aluminum chloride, dioctyl aluminum chloride, diphenyl aluminum chloride, di-p-tolyl aluminum chloride, dibenzyl aluminum chloride, ethylbenzyl aluminum chloride, ethyl p-tolyl aluminum chloride, methyl alumoxane, ethyl alumoxane, n-propyl alumoxane, and n-butyl alumoxane.

Preferably, the molar ratio of the rare earth complex, the organoboron compound, and the organoaluminum compound is $1:(0.5-2.0):(0.5-3000)$.

Preferably, the molar ratio of the functionalized styrene and the rare earth complex is $(50-10000):1$, and the molar ratio of the styrene and the rare earth complex is $(50-10000):1$.

Preferably, the temperature for the reaction is $-60°$ C. to $80°$ C.; and the time for the reaction is 0.1 hours to 48 hours.

Compared to the prior art, this invention provides a functionalized highly syndiotactic polystyrene, comprising a repeating unit having a structure represented by formula (I), or comprising a repeating unit having a structure represented by formula (I) and a repeating unit having a structure represented by formula (II). It is indicated by the experimental results that the syndiotacticity selectivity of the highly syndiotactic polymer provided by this invention is no less than 90%, and the proportion of the repeating unit having a structure represented by formula (I) in the polymer may be arbitrarily adjusted and may be up to 100%. Meanwhile, the oxygen- or sulfur-containing groups in the polymer may increase the polarity of the highly syndiotactic polystyrene so as to increase the blendability of the highly syndiotactic polystyrene with other polymers.

Furthermore, this invention also provides a preparation method of a functionalized highly syndiotactic polystyrene, comprising: performing a reaction of a functionalized styrene or a reaction of styrene and a functionalized styrene under the action of a catalyst to obtain the functionalized highly syndiotactic polystyrene, wherein the highly syndiotactic polymer comprises a repeating unit having a structure represented by formula (I) or, comprises a repeating unit having a structure represented by formula (I) and a repeating unit having a structure represented formula (II). In this disclosure, by using a rare earth complex, an organoboron compound, and an organoaluminum compound as a catalyst, a functionalized highly syndiotactic polystyrene is synthesized by a method of coordination polymerization for the first time and the insertion rate of the structural units of functionalized styrene in the copolymer may be arbitrarily regulated, which breaks through the limit that the insertion rate of functionalized monomers in the copolymer is low in the past.

DETAILED DESCRIPTION OF THE INVENTION

Figure 1:
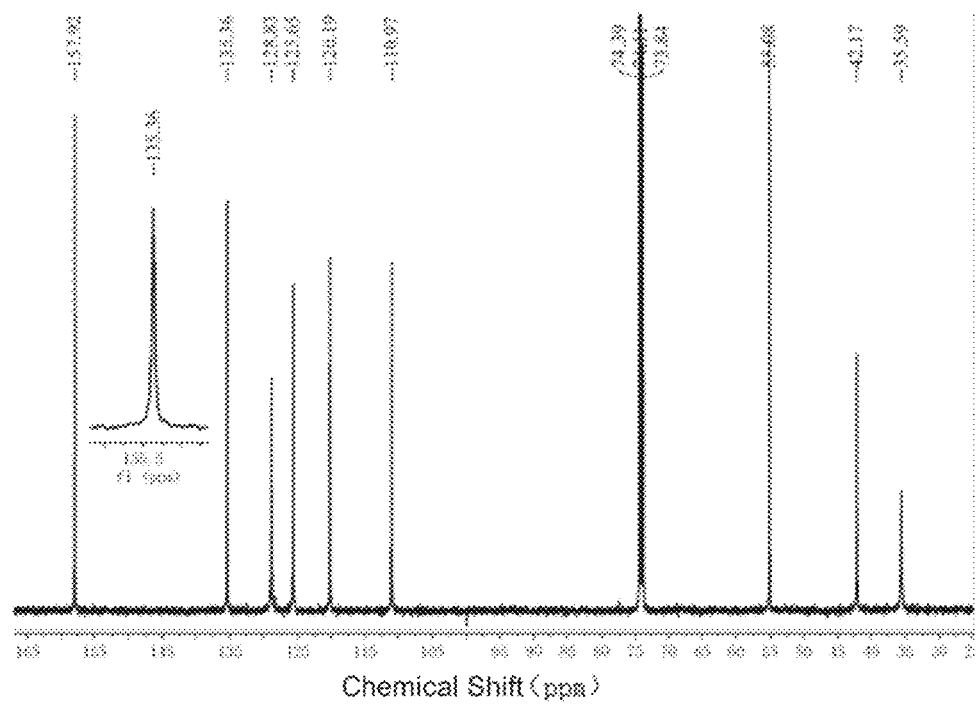
FIG. 1 is a carbon nuclear magnetic resonance spectrogram of the functionalized highly syndiotactic polystyrene prepared in Example 42 of this disclosure.

The technical solutions in the embodiments of this invention will be described clearly and fully below. Obviously, the embodiments described are merely part of the embodiments of this invention, rather than all of the embodiments. Based on the embodiments in this invention, all other embodiments obtained by those of ordinary skill in the art without performing inventive work belong to the scope protected by this invention. Embodiments of this patent will described below in two aspects of a homopolymer of functionalized styrene and a highly syndiotactic copolymer of functionalized styrene and styrene.

This invention provides a functionalized highly syndiotactic polystyrene, comprising a repeating unit having a structure represented by formula (I), or comprising a repeating unit having a structure represented by formula (I) and a repeating unit having a structure represented by formula (II),

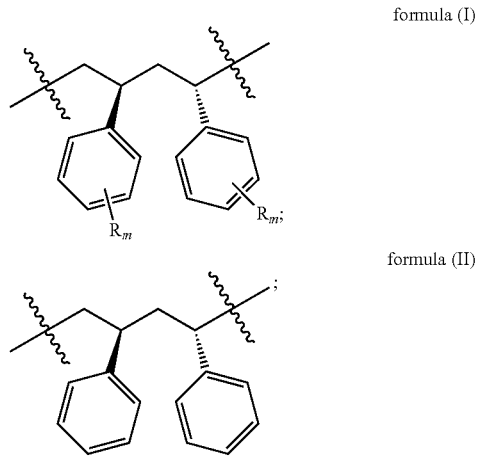

formula (I)

formula (II)

wherein in formula (I),

R is independently selected from a $C_{1-20}$ alkoxy group, a $C_{6-20}$ aryloxy group, a $C_{1-20}$ alkylthio group, a $C_{6-20}$ arylthio group, or a $C_{6-20}$ aryl group, and m is the number of substituent R and is independently selected from an integer from 1 to 5.

The selectivity of the syndiotacticity of the highly syndiotactic polystyrene provided by this invention is no less than 90%, and the insertion rate of structural units of functionalized styrene may be arbitrarily adjusted and may be up to 100%. Meanwhile, oxygen- or sulfur-containing groups in the copolymer may increase the polarity of highly syndiotactic polystyrene so as to increase the blendability of the highly syndiotactic polystyrene with other polymers.

With respect to the functionalized highly syndiotactic polystyrene provided by this invention, in the copolymer comprising a repeating unit having a structure represented by formula (I) and a repeating unit having a structure represented by formula (II), these two kinds of repeating units are randomly arranged on the molecular chain of the copolymer.

In the highly syndiotactic copolymer provided by this invention, R is a substituent on a benzene ring, preferably a $C_{1-20}$ alkoxy group, a $C_{6-20}$ aryloxy group, a $C_{1-20}$ alkylthio group, a $C_{6-20}$ arylthio group, or a $C_{6-20}$ aryl group, more preferably a $C_{2-10}$ alkoxy group, a $C_{7-10}$ aryloxy group, a $C_{2-10}$ alkylthio group, a $C_{7-10}$ arylthio group, or a $C_{6-9}$ aryl group, more preferably a $C_{3-8}$ alkoxy group, a $C_{8-9}$ aryloxy group, a $C_{3-8}$ alkylthio group, a $C_{8-9}$ arylthio group, or a $C_{6-7}$ aryl group, and most preferably a $C_{4-6}$ alkoxy group, a $C_8$ aryloxy group, a $C_{4-6}$ alkylthio group, a $C_8$ arylthio group, or a $C_6$ aryl group. In this invention, said R may be, but not limited to, —O—$CH_3$, —O—$CH_2CH_3$, —O—$CH_2CH_2CH_3$, —O—$CH_2$-Ph, —O-Ph, —S-Ph, —S—$CH_2$-Ph, —$C_6H_5$, or —S—$CH_3$. In this invention, the position of the substituent R is not limited, and substitution may be performed at any position on the benzene ring.

In this invention, m is the number of substituent R and may be any integer of 1 to 5, and in particular, it may be 1, 2, 3, 4, or 5. That is, the number of the substituent R is not limited, and either mono-substitution or multi-substitution is possible. When m≥2, the substituents R on the same benzene ring in the formula (I) may be the same substituent, or may be different substituents.

The number average molecular weight of the functionalized highly syndiotactic polystyrene provided by this invention is preferably $1\times10^4$ to $300\times10^4$, more preferably $2\times10^4$ to $200\times10^4$, and most preferably $10\times10^4$ to $150\times10^4$. The syndiotacticity of the highly syndiotactic copolymer is no less than 90%, and preferably 90% to 99%. The mole fraction w of the repeating units represented by formula (I) is 0%<w≤100%. Said w is the molar ratio of the repeating units represented by formula (I) to the total number of the repeating units in the highly syndiotactic copolymer.

This invention also provides a preparation method of a highly syndiotactic copolymer of styrene and functionalized styrene, comprising:

performing a reaction of a functionalized styrene or a reaction of styrene and a functionalized styrene under the action of a catalyst to obtain the functionalized highly syndiotactic polystyrene, wherein the highly syndiotactic polymer comprises a repeating unit having a structure represented by formula (I) or, comprises a repeating unit having a structure represented by formula (I) and a repeating unit having a structure represented formula (II):

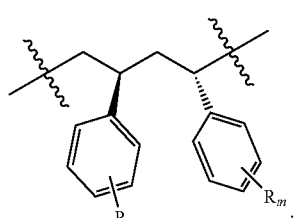

formula (I)

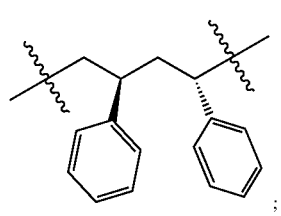

formula (II)

wherein the functionalized styrene has a structure represented by formula (III):

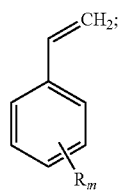

formula (III)

wherein in formula (I) and formula (III),

R is independently selected from a $C_{1-20}$ alkoxy group, a $C_{6-20}$ aryloxy group, a $C_{1-20}$ alkylthio group, a $C_{6-20}$ arylthio group, or a $C_{6-20}$ aryl group;

m is the number of substituent R and is independently selected from an integer from 1 to 5; and the catalyst comprises a rare earth complex, an organoboron compound, and an organoaluminum compound.

In this invention, by using a rare earth complex, an organoboron compound, and an organoaluminum compound as a catalyst, a functionalized highly syndiotactic polystyrene is synthesized by a method of coordination polymerization and the proportion of structural units of functionalized styrene in the copolymer may be arbitrarily regulated, which breaks through the limit that the insertion rate of functionalized monomers in the copolymer is low in the past.

In this invention, under the action of a catalyst, a functionalized styrene or styrene and a functionalized styrene are polymerized to obtain a functionalized highly syndiotactic polystyrene. In this invention, the catalyst comprises a rare earth complex, an organoboron compound, and an organoaluminum compound.

In this invention, the rare earth complex is preferably a compound having a structure represented by formula (IV) or a compound having a structure represented by formula (V):

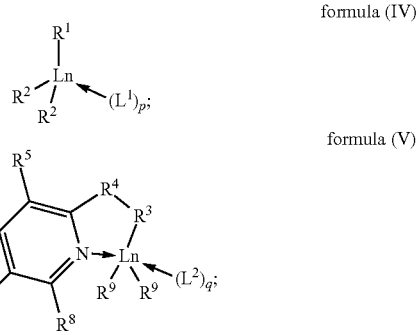

wherein in formula (IV), $R^1$ is preferably any one of a cyclopentadienyl group and derivatives thereof, an indenyl group and derivatives thereof, or a fluorene group and derivatives thereof; and more preferably a cyclopentadienyl group, an indenyl group, or a fluorene group.

$R^2$ is preferably a $C_{1-10}$ alkyl group, a $C_{1-10}$ silyl group, a $C_{6-10}$ aminoaryl group, a $C_{1-10}$ silylamino group, a $C_{1-10}$ alkylamino group, a $C_{3-10}$ allyl group, or a borohydride group; more preferably a $C_{2-8}$ alkyl group, a $C_{2-8}$ silyl group, a $C_{7-9}$ aminoaryl group, a $C_{2-8}$ silylamino group, a $C_{2-8}$ alkylamino group, a $C_{4-9}$ allyl group, or a borohydride group; more preferably a $C_{3-6}$ alkyl group, a $C_{3-6}$ silyl group, a $C_8$ aminoaryl group, a $C_{3-6}$ silylamino group, a $C_{3-6}$ alkylamino group, a $C_{5-6}$ allyl group, or a borohydride group; and most preferably a $C_{3-6}$ silyl group. In this invention, said $R^2$ may be, but not limited to, $-CH_3$, $-CH_2SiMe_3$, $-CH(SiMe_3)_2$, $-O-NMe_2-CH_2C_6H_4$, $-N(SiMe_3)_2$, $-NH(SiMe_3)$, $-1,3-C_3H_5$, or $-BH_4$.

$L^1$ is a ligand, preferably tetrahydrofuran, ethyl ether, ethylene glycol dimethyl ether, or toluene; and more preferably tetrahydrofuran, ethyl ether, or toluene.

p is the number of $L^1$, wherein 0≤p≤2; and it may be 0, 1, or 2. When p is 0, the rare earth complex represented by the formula (IV) does not have any ligand.

Ln is preferably Sc, Y, La, Ce, Pr, Nd, Pm, Sm, Eu, Gd, Tb, Dy, Ho, Er, Tm, Yb, or Lu; and more preferably Sc, Y, La, Lu, Ho, Gd, Nd, or Er.

In this invention, the compound having a structure represented by formula IV is preferably any one of the compounds having the structures represented by formula 1 to formula 16:
formula 1
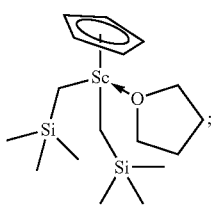
formula 2
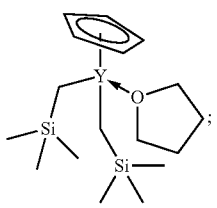
formula 3
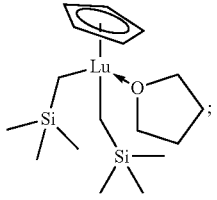
formula 4
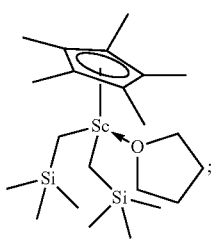
formula 5
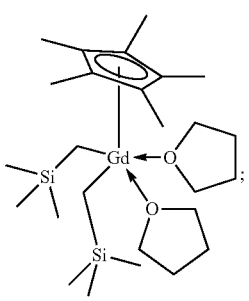
formula 6
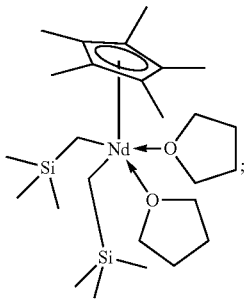
formula 7
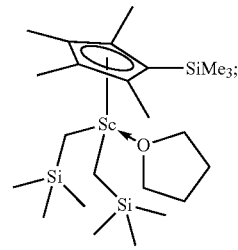
formula 8
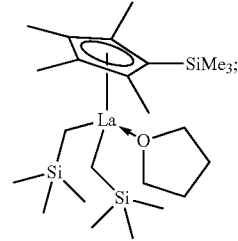
formula 9
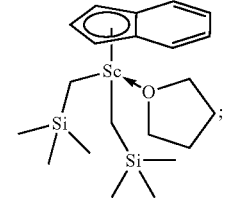
formula 10
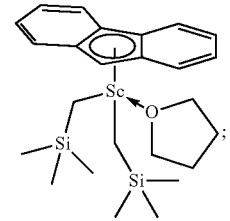
formula 11
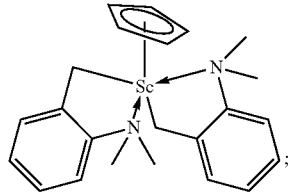
formula 12

-continued

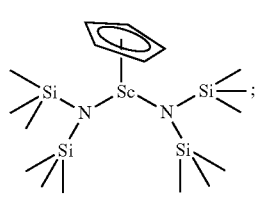

formula 13

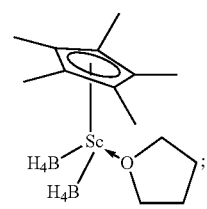

formula 14

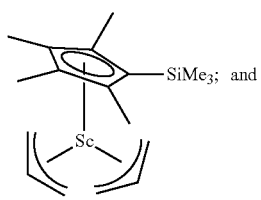

formula 15

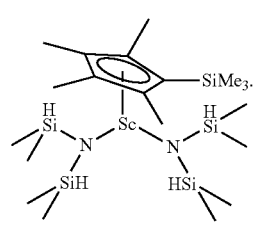

formula 16

In this invention, the end groups set forth in the formula 1 to the formula 16 are all methyl groups.

The source of the compound having a structure represented by formula (IV) is not particularly limited in this invention and this compound may be prepared according to the preparation methods for preparing the compound having a structure represented by formula (IV) which are well-known for those skilled in the field. Preferably, the compounds having structures represented by formula 1, formula 5, and formula 8 may be prepared according to the method disclosed in the document, J. AM. CHEM. SOC., 2009, 131, 13870-13882; the compound having a structure represented by formula 10 may be prepared according to the method disclosed in the document, Chem. Eur. J., 2009, 846-850; the compound having a structure represented by formula 11 may be prepared according to the method disclosed in the document, Organometalics, 2013, 32, 1445-1458; the compound having a structure represented by formula 12 may be prepared according to the method disclosed in the document, Angew. Chem. Int. Ed. 2013, 52, 4418-4421; the compounds having structures represented by formula 13 and formula 16 may be prepared according to the method disclosed in the document, Organometalics, 2011, 30, 3270-3274; the compound having a structure represented by formula 14 may be prepared according to the method disclosed in the document, Chem. Commun., 2009, 3380-3382; the compounds having a structure represented by formula 15 may be prepared according to the method disclosed in the document, Chem. Asian J. 2008, 3, 1406-1414.

In formula (V):

$R^3$ is preferably any one of a cyclopentadienyl group and derivatives thereof, an indenyl group and derivatives thereof, or a fluorene group and derivatives thereof; and more preferably a cyclopentadienyl group, a indenyl group, or a fluorene group.

$R^4$ is preferably a methylene group, an ethylene group, or a dimethylsilyl group; and more preferably a methylene group or an ethylene group; the ethylene group is a group in which an ethyl group loses two hydrogen atoms, and the dimethylsilyl group has a structure of

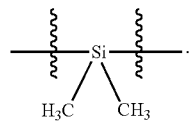

$R^5$, $R^6$, $R^7$ are independently preferably hydrogen, a methyl group, an ethyl group, an isopropyl group, a tert-butyl group, or a phenyl group; and more preferably hydrogen, a methyl group, or an ethyl group.

$R^8$ is preferably hydrogen, a methyl group, an ethyl group, an isopropyl group, a tert-butyl group, a phenyl group, a 2,6-dimethylphenyl group, a 4-methylphenyl group, a s-trimethylphenyl group, a 2,6-diisopropyl phenyl group, a 2,4,6-triisopropyl phenyl group, or a 2,6-di-tert-butyl phenyl group; and more preferably hydrogen, a methyl group, an ethyl group, an isopropyl group, a tert-butyl group, or a s-trimethylphenyl.

$R^9$ is preferably a $C_{1-10}$ alkyl group, a $C_{1-10}$ silyl group, a $C_{6-10}$ aminoaryl group, a $C_{1-10}$ silylamino group, a $C_{1-10}$ alkylamino group, a $C_{3-10}$ allyl group, or a borohydride group; more preferably a $C_{2-8}$ alkyl group, a $C_{2-8}$ silyl group, a $C_{7-9}$ aminoaryl group, a $C_{2-8}$ silylamino group, a $C_{2-8}$ alkylamino group, a $C_{4-9}$ allyl group, or a borohydride group; more preferably a $C_{3-6}$ alkyl group, a $C_{3-6}$ silyl group, a $C_8$ aminoaryl group, a $C_{3-6}$ silylamino group, a $C_{3-6}$ alkylamino group, a $C_{5-6}$ allyl group, or a borohydride group; and most preferably a $C_{3-6}$ silyl group. In this invention, said $R^9$ may be, but not limited to, —$CH_3$, —$CH_2SiMe_3$, —$CH(SiMe_3)_2$, —O—$NMe_2$-$CH_2C_6H_4$, —$N(SiMe_3)_2$, —$NH(SiMe_3)$, -1,3-$C_3H_5$, or —$BH_4$.

$L^2$ is a ligand, preferably tetrahydrofuran, ethyl ether, ethylene glycol dimethyl ether, or toluene; and more preferably tetrahydrofuran, ethyl ether, or toluene.

q is the number of $L^2$, wherein $0 \leq q \leq 2$; and it may be 0, 1, or 2. When q is 0, the rare earth complex represented by the formula (V) does not have any ligand.

Ln is preferably Sc, Y, La, Ce, Pr, Nd, Pm, Sm, Eu, Gd, Tb, Dy, Ho, Er, Tm, Yb, or Lu; and more preferably Sc, Y, La, Lu, Ho, Gd, Nd, or Er.

In this invention, the compound having a structure represented by formula V is preferably any one of the compounds having the structures represented by formula 17 to formula 28:

formula 17

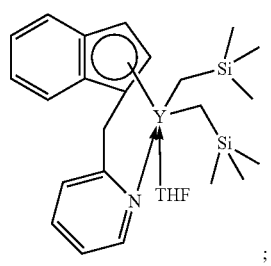

-continued
formula 18
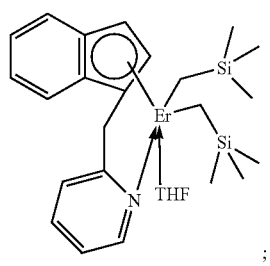
formula 19
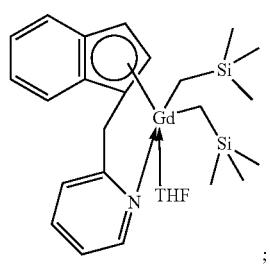
formula 20
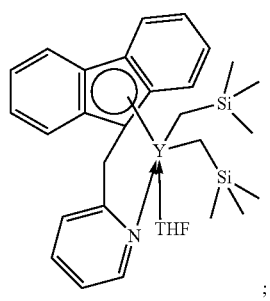
formula 21
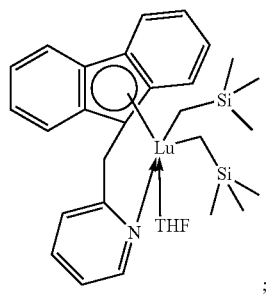
formula 22
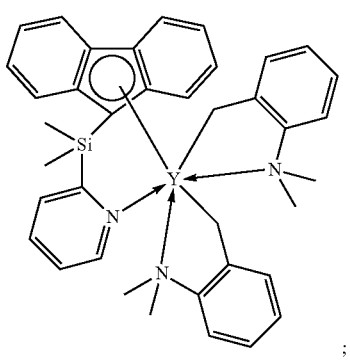
formula 23
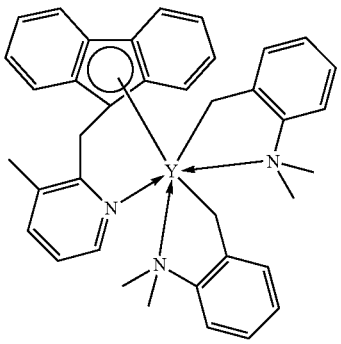
formula 24
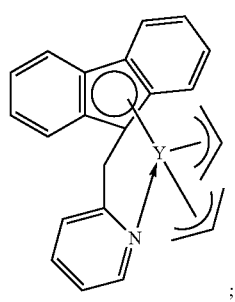
formula 25
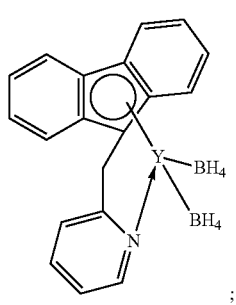
formula 26
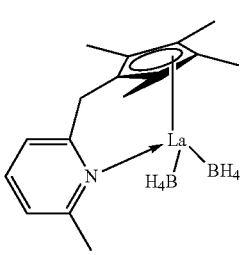
formula 27
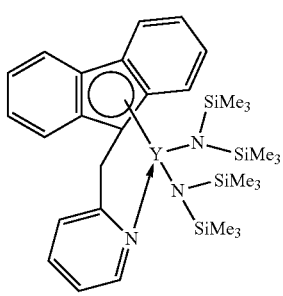
; and formula 28

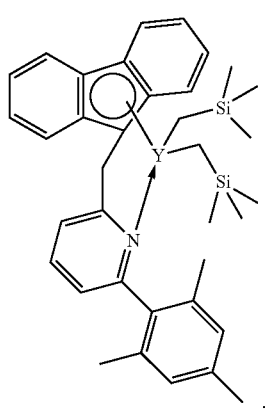

In this invention, the end groups set forth in the formula 17 to the formula 28 are all methyl groups.

The source of the compound having a structure represented by formula (V) is not particularly limited in this invention and this compound may be prepared according to the preparation methods for preparing the compound having a structure represented by formula (V) which are well-known for those skilled in the field. For example, the compounds having structures represented by formula 17 to formula 28 may be prepared according to the method disclosed in the document, Macromolecules, 2012, 45, 1248-1253, as well as the methods disclosed in Chinese Patent Application Nos. 201210020478.1 and 201310750870.6.

In this invention, the organoboron compound is preferably $[Ph_3C][B(C_6F_5)_4]$, $[PhNMe_2H][BPh_4]$, $[NEt_3H][BPh_4]$, $[PhNMe_2H][B(C_6F_5)_4]$, or $B(C_6F_5)_3$; and more preferably $[Ph_3C][B(C_6F_5)_4]$, $[PhNMe_2H][B(C_6F_5)_4]$, $B(C_6F_5)_3$. The source of the organoboron compound is not particularly limited in this invention and the above types of organoboron compounds well known by the person skilled in the art may be used, which may be commercially available.

In this invention, the organoaluminum compound is preferably one or more of an alkyl aluminum, a hydrogenated alkyl aluminum, a halogenated alkyl aluminum, and an alumoxane, and more preferably one or more selected from trimethyl aluminum, triethyl aluminum, tri-n-propyl aluminum, tri-n-butyl aluminum, triisopropyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyldibenzyl aluminum, ethyl di-p-tolyl aluminum, diethylbenzyl aluminum, dimethyl aluminum hydride, diethyl aluminum hydride, di-n-propyl aluminum hydride, di-n-butyl aluminum hydride, diisopropyl aluminum hydride, diisobutyl aluminum hydride, dipentyl aluminum hydride, dihexyl aluminum hydride, dicyclohexyl aluminum hydride, dioctyl aluminum hydride, diphenyl aluminum hydride, di-p-tolyl aluminum hydride, dibenzyl aluminum hydride, ethylbenzyl aluminum hydride, ethyl p-tolyl aluminum hydride, dimethyl aluminum chloride, diethyl aluminum chloride, di-n-propyl aluminum chloride, di-n-butyl aluminum chloride, diisopropyl aluminum chloride, diisobutyl aluminum chloride, dipentyl aluminum chloride, dihexyl aluminum chloride, dicyclohexyl aluminum chloride, dioctyl aluminum chloride, diphenyl aluminum chloride, di-p-tolyl aluminum chloride, dibenzyl aluminum chloride, ethylbenzyl aluminum chloride, ethyl p-tolyl aluminum chloride, methyl alumoxane, ethyl alumoxane, n-propyl alumoxane, and n-butyl alumoxane; and most preferably one or more of triisobutyl aluminum, triethyl aluminum, trimethyl aluminum, methyl alumoxane, and hydrogenated diisobutyl aluminum.

The source of the organoaluminum compound is not particularly limited in this invention and may be typically commercially available.

In this invention, the molar ratio of the rare earth complex, the organoboron compound, and the organoaluminum compound is preferably 1:(0.5-2.0):(0.5-3000), more preferably 1:(0.8-1.5):(1-1000), and most preferably 1:(0.9-1.1):(2-500).

In this invention, the preparation method of the catalyst preferably comprises the steps of mixing a rare earth complex, an organoboron compound, and an organoaluminum compound to obtain a catalyst.

In this invention, the temperature of the mixing is preferably −60° C. to 80° C., more preferably −20° C. to 60° C., still more preferably 0° C. to 60° C., and most preferably 25° C. to 40° C. In this invention, the time of the mixing is preferably 1 minute to 4 minutes, and more preferably 2 minutes to 3 minutes. In this invention, the mixing is preferably performed under the condition of a protective gas. In this invention, the protective gas is preferably an inert gas, and more preferably nitrogen gas or argon gas. In this invention, the types, the sources, and the molar ratio of the rare earth complex, the organoboron compound, and the organoaluminum compound are consistent with those of the rare earth complex, the organoboron compound, and the organoaluminum compound described in the above technical solutions, and verbose words are omitted herein.

In this invention, the catalyst is preferably a catalyst solution. In this invention, the solvent in the catalyst solution is preferably one or more of an alkane, an aromatic hydrocarbon, a halogenated aromatic hydrocarbon, and a cycloalkane, more preferably one or more of a saturated alkane, a saturated aromatic hydrocarbon, a saturated halogenated aromatic hydrocarbon, and a saturated cycloalkane, and most preferably one or more of n-hexane, n-heptane, cyclohexane, benzene, toluene, xylene, chlorobenzene, dichlorobenzene, and trichlorobenzene. The source of the solvent in the catalyst solution is not particularly limited in this invention, which may be commercially available. In this invention, the molar concentration of the rare earth complex in the catalyst solution is preferably 0.1 mmol/L to 500 mmol/L, more preferably 0.2 mmol/L to 50 mmol/L, and most preferably 0.3 mmol/L to 5 mmol/L.

In this invention, the preparation method of the catalyst solution preferably comprises the steps of dispersing a catalyst in a solvent to obtain a catalyst solution.

In this invention, dispersing a catalyst in an organic solvent under the condition of a protective gas to obtain a catalyst solution is more preferable. In this invention, the protective gas is preferably an inert gas, and more preferably nitrogen gas or argon gas. The method of the dispersion is not particularly limited in this invention and the technical solutions of dispersion well known by the person skilled in the art may be used.

The usage amount of the solvent is not particularly limited in this invention, and the molar concentration of the rare earth complex in the catalyst solution is allowed to be up to the molar concentration of the rare earth complex in the catalyst solution described in the above technical solutions.

In this invention, the functionalized styrene has a structure represented by formula (III):

formula (III)

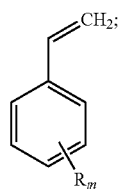

wherein R is a substituent on a benzene ring, preferably a $C_{1-20}$ alkoxy group, a $C_{6-20}$ aryloxy group, a $C_{1-20}$ alkylthio group, a $C_{6-20}$ arylthio group, or a $C_{6-20}$ aryl group, more preferably a $C_{2-10}$ alkoxy group, a $C_{7-10}$ aryloxy group, a $C_{2-10}$ alkylthio group, a $C_{7-10}$ arylthio group, or a $C_{6-9}$ aryl group, more preferably a $C_{3-8}$ alkoxy group, a $C_{8-9}$ aryloxy group, a $C_{3-8}$ alkylthio group, a $C_{8-9}$ arylthio group, or a $C_{6-7}$ aryl group, and most preferably a $C_{4-6}$ alkoxy group, a $C_8$ aryloxy group, a $C_{4-6}$ alkylthio group, a $C_8$ arylthio group, or a $C_6$ aryl group. In this invention, said R may be, but not limited to, —O—CH$_3$, —O—CH$_2$CH$_3$, —O—CH$_2$CH$_2$CH$_3$, —O—CH$_2$-Ph, —O-Ph, —S-Ph, —S—CH$_2$-Ph, —C$_6$H$_5$, or —S—CH$_3$. In this invention, the position of the substituent R is not limited, and the substitution may be performed at any position on the benzene ring.

m is the number of substituent R and may be any integer of 1 to 5, and in particular, it may be 1, 2, 3, 4, or 5. That is, the number of the substituent R is not limited, and either mono-substitution or multi-substitution is possible. When m≥2, the substituents R on the same benzene ring in the formula (III) may be the same substituent, or may be different substituents.

In this invention, the functionalized styrene is preferably any one of the compounds having the structures represented by formula A to formula W:

formula A

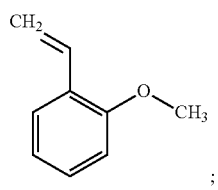

formula B

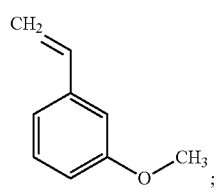

formula C

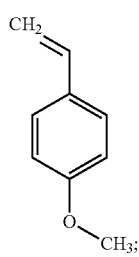

formula D

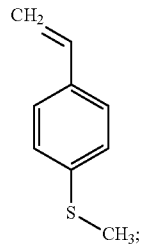

formula E

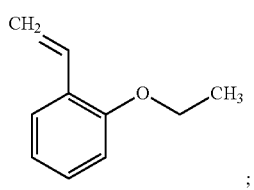

formula F

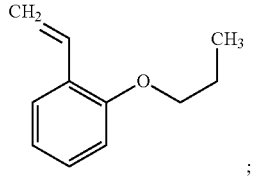

formula G

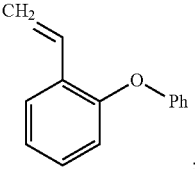

formula H

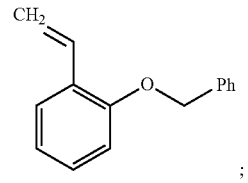

formula I

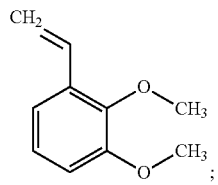

formula J

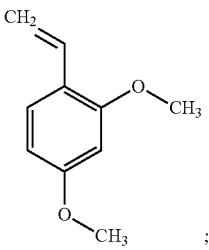

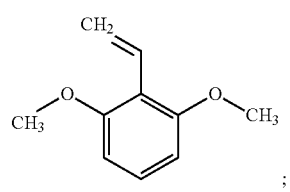
formula K;
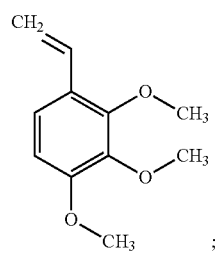
formula M;
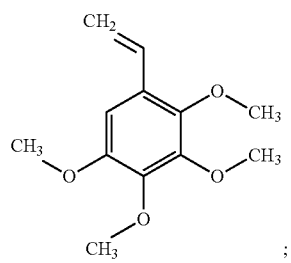
formula N;
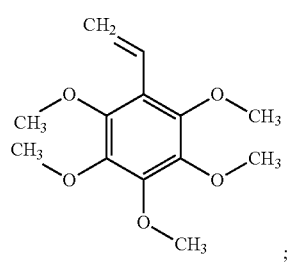
formula O;
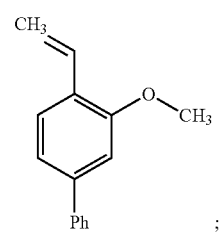
formula P;
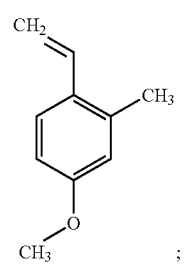
formula Q;
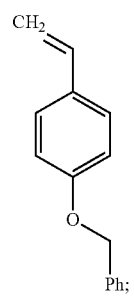
formula S;
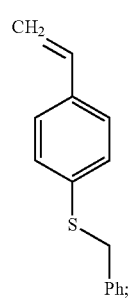
formula T;
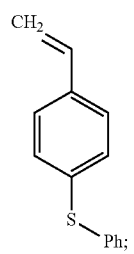
formula U;
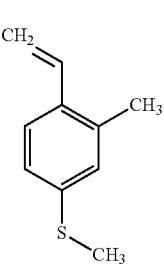
formula V;
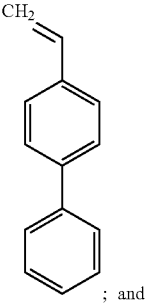
formula W; and

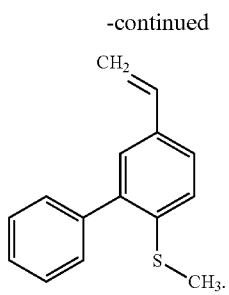

formula X

The source of the functionalized styrene is not particularly limited in this invention and the above types of functionalized styrene well known by the person skilled in the art may be used, which may be commercially available.

In this invention, the molar ratio of the functionalized styrene and the rare earth complex is preferably (50-10000):1, more preferably (100-8000):1, and most preferably (200-6000):1.

The molar ratio of the styrene and the rare earth complex is (50-10000):1, more preferably (100-8000):1, and most preferably (200-6000):1.

The molar ratio of the styrene and the functionalized styrene is not particularly limited in this invention and may be arbitrarily adjusted.

In this invention, the reaction of functionalized styrene or the reaction of styrene and functionalized styrene are performed under the action of a catalyst to obtain a highly syndiotactic homopolymer polymerized from the repeating units having a structure represented by formula (I) and a highly syndiotactic copolymer randomly copolymerized from the repeating units having a structure represented by formula (I) and a structure represented by formula (II).

In this invention, the polymerization reaction is preferably performed under the condition without water and air. In this invention, the temperature of the polymerization reaction is preferably −60° C. to 80° C., more preferably −30° C. to 60° C., still more preferably 0° C. to 50° C., and most preferably 20° C. to 40° C. In this invention, the time of the polymerization reaction is preferably 0.1 hours to 48 hours, more preferably 1 hour to 35 hours, still more preferably 2 hours to 24 hours, and most preferably 4 hours to 12 hours.

In this invention, the polymerization reaction may be either a solution polymerization performed in the presence of a solvent or a bulk polymerization performed in the absence of a solvent. When the polymerization reaction is performed in the presence of a solvent, the solvent is preferably one or more of an alkane, an aromatic hydrocarbon, a halogenated aromatic hydrocarbon, and a cycloalkane, more preferably one or more of a saturated alkane, a saturated aromatic hydrocarbon, a saturated halogenated aromatic hydrocarbon, and a saturated cycloalkane, and most preferably one or more of n-hexane, n-heptane, cyclohexane, benzene, toluene, xylene, chlorobenzene, dichlorobenzene, and trichlorobenzene. The source of the solvent in the polymerization reaction is not particularly limited in this invention and may be commercially available.

In this invention, when the polymerization reaction is performed in the presence of a solvent, the usage amount of the solvent preferably allows the mass concentration of the functionalized styrene to be 1 g/100 mL to 60 g/100 mL, more preferably 2 g/100 mL to 50 g/100 mL, still more preferably 3 g/100 mL to 35 g/100 mL, and most preferably 5 g/100 mL to 20 g/100 mL.

After the completion of the polymerization reaction, a hydrochloric acid-ethanol solution is preferably used in this invention to terminate the polymerization reaction; and the resultant reaction solution is settled and dried to obtain a functionalized highly syndiotactic polystyrene. In this invention, the volume concentration of the hydrochloric acid-ethanol solution is preferably 5% to 15%, more preferably 8% to 12%, and most preferably 10%. In this invention, the reagent used for the settling is preferably methanol. The method for drying is not limited in this invention, which may be a drying method well known in the art, and is preferably vacuum drying in this invention. In this invention, the time of the drying is preferably 40 hours to 60 hours, more preferably 45 hours to 55 hours, and most preferably 50 hours.

The functionalized highly syndiotactic polystyrene provided by this invention is subjected to detection of carbon and hydrogen nuclear magnetic resonance spectra. It is indicated by the results that a polymer having a highly syndiotactic structure is prepared in this invention, the syndiotacticity selectivity of which >90%, and the insertion rate of structural units of functionalized styrene may be arbitrarily adjusted between 0% to 100%. The number average molecular weight of the functionalized highly syndiotactic polystyrene provided by this invention is tested using a gel permeation chromatography, and the test result is that the number average molecular weight thereof is $1\times10^4$ to $300\times10^4$. The melting point of the functionalized highly syndiotactic polystyrene provided by this invention is tested by a differential scanning calorimeter, and the test result is that the melting point of the functionalized highly syndiotactic polystyrene provided by this invention is 175° C. to 320° C. The contact angle of the functionalized highly syndiotactic polystyrene provided by this invention is tested using a contact angle measuring instrument, and the test result is that the contact angle thereof is 85.4° to 95.60.

This invention provides a functionalized highly syndiotactic polystyrene. It is indicated by experimental results that the syndiotacticity selectivity of the highly syndiotactic copolymer provided by this invention is no less than 90%, and the insertion rate of structural units of functionalized styrene in the copolymer may be arbitrarily adjusted. Meanwhile, the oxygen- or sulfur-containing groups in the copolymer may increase the polarity of highly syndiotactic polystyrene so as to increase the blendability of highly syndiotactic polystyrene with other polymers.

Meanwhile, this invention also provides a preparation method of a functionalized highly syndiotactic polystyrene, comprising the step of performing a reaction of a functionalized styrene or performing a reaction of styrene and a functionalized styrene under the action of a catalyst to obtain a functionalized highly syndiotactic polystyrene. In this invention, by using a rare earth complex, an organoboron compound, and an organoaluminum compound as a catalyst, a functionalized highly syndiotactic polystyrene is synthesized by a method of coordination polymerization and the insertion rate of the structural units of the functionalized styrene in the copolymer may be arbitrarily regulated, which breaks through the limit that the insertion rate of functionalized monomers in the copolymer is low in the past. Moreover, the functionalized highly syndiotactic polystyrene provided by this invention contains a functionalized group containing sulfur and oxygen elements, and this functionalized highly syndiotactic polystyrene has a better polarity.

In order to further illustrate this invention, the detailed description will be made in conjunction with the Examples below, with respect to the highly syndiotactic copolymer of styrene and the functionalized styrene provided by this invention and the preparation method thereof.

Example 1

At 25° C., 10 μmol of a rare earth complex having a structure represented by formula 1, 10 μmol of [Ph$_3$C][B(C$_6$F$_5$)$_4$], 100 μmol of triisobutyl aluminum, and 5 mL of a toluene solvent were added to a 25 mL polymerization container which has been treated for removing water and air, and after mixing for 2 minutes, a catalyst toluene solution in which the molar concentration of the rare earth complex is 2.0 mmol*L$^{-1}$ was obtained.

Examples 2 to 41

According to the method of Example 1, catalyst solutions were prepared respectively using the raw material proportions and the reaction conditions in Table 1. Table 1 shows raw material proportions and reaction conditions of Examples 2 to 41. The volume of the reaction container may be determined at discretion according to the volume of the solvent added.

TABLE 1

The Raw material proportions and the reaction conditions of Examples 2 to 41

| Example | Mixing temperature/° C. | Rare earth complex | Usage amount of rare earth complex/μmol | Organoboron compound | Usage amount of organoboron compound/μmol |
|---|---|---|---|---|---|
| 2 | 25 | Structure represented by formula 2 | 10 | [Ph$_3$C][B(C$_6$F$_5$)$_4$] | 10 |
| 3 | 0 | Structure represented by formula 2 | 10 | [Ph$_3$C][B(C$_6$F$_5$)$_4$] | 10 |
| 4 | −60 | Structure represented by formula 2 | 10 | [Ph$_3$C][B(C$_6$F$_5$)$_4$] | 10 |
| 5 | 40 | Structure represented by formula 2 | 10 | [Ph$_3$C][B(C$_6$F$_5$)$_4$] | 10 |
| 6 | 80 | Structure represented by formula 2 | 10 | [Ph$_3$C][B(C$_6$F$_5$)$_4$] | 10 |
| 7 | 25 | Structure represented by formula 3 | 10 | [PhNHMe$_2$][B(C$_6$F$_5$)$_4$] | 10 |
| 8 | −40 | Structure represented by formula 4 | 10 | [Ph$_3$C][B(C$_6$F$_5$)$_4$] | 10 |
| 9 | 25 | Structure represented by formula 5 | 10 | [Ph$_3$C][B(C$_6$F$_5$)$_4$] | 10 |
| 10 | 60 | Structure represented by formula 6 | 10 | [PhNHMe$_2$][B(C$_6$F$_5$)$_4$] | 10 |
| 11 | 25 | Structure represented by formula 7 | 10 | [Ph$_3$C][BPh$_4$] | 10 |
| 12 | 0 | Structure represented by formula 8 | 10 | [PhNHMe$_2$][BPh$_4$] | 20 |
| 13 | 80 | Structure represented by formula 9 | 10 | B(C$_6$F$_5$)$_3$ | 10 |
| 14 | 0° C. | Structure represented by formula 10 | 10 | [Ph$_3$C][B(C$_6$F$_5$)$_4$] | 10 |
| 15 | 40 | Structure represented by formula 11 | 10 | [PhNHMe$_2$][B(C$_6$F$_5$)$_4$] | 10 |
| 16 | 25 | Structure represented by formula 12 | 10 | [NEt$_3$H][BPh$_4$] | 10 |
| 17 | −60 | Structure represented by formula 13 | 10 | [Ph$_3$C][BPh$_4$] | 10 |
| 18 | 80 | Structure represented by formula 14 | 10 | [Ph$_3$C][BPh$_4$] | 10 |
| 19 | 0 | Structure represented by formula 15 | 10 | [Ph$_3$C][B(C$_6$F$_5$)$_4$] | 10 |
| 20 | 25 | Structure represented by formula 16 | 10 | [Ph$_3$C][B(C$_6$F$_5$)$_4$] | 10 |

TABLE 1-continued

The Raw material proportions and the reaction conditions of Examples 2 to 41

| 21 | 25  | Structure represented by formula 17 | 10 | [Ph₃C][B(C₆F₅)₄]   | 10  |
|----|-----|-------------------------------------|----|--------------------|-----|
| 22 | 25  | Structure represented by formula 18 | 10 | [PhNMe₂H][BPh₄]    | 10  |
| 23 | 25  | Structure represented by formula 19 | 10 | [Ph₃C][BPh₄]       | 20  |
| 24 | 40  | Structure represented by formula 20 | 10 | [NEt₃H][BPh₄]      | 100 |
| 25 | 0   | Structure represented by formula 21 | 10 | [Ph₃C][B(C₆F₅)₄]   | 10  |
| 26 | −60 | Structure represented by formula 22 | 10 | [PhNHMe₂][BPh₄]    | 10  |
| 27 | 25  | Structure represented by formula 23 | 10 | [Ph₃C][B(C₆F₅)₄]   | 10  |
| 28 | 25  | Structure represented by formula 23 | 10 | [Ph₃C][B(C₆F₅)₄]   | 5   |
| 29 | 0   | Structure represented by formula 23 | 10 | [Ph₃C][B(C₆F₅)₄]   | 10  |
| 30 | −60 | Structure represented by formula 23 | 10 | [Ph₃C][B(C₆F₅)₄]   | 10  |
| 31 | 40  | Structure represented by formula 23 | 10 | [Ph₃C][B(C₆F₅)₄]   | 10  |
| 32 | 80  | Structure represented by formula 23 | 10 | [Ph₃C][B(C₆F₅)₄]   | 10  |
| 33 | 25  | Structure represented by formula 24 | 10 | [PhNHMe₂][B(C₆F₅)₄]| 10  |
| 34 | −40 | Structure represented by formula 24 | 10 | [Ph₃C][B(C₆F₅)₄]   | 10  |
| 35 | 25  | Structure represented by formula 25 | 10 | [Ph₃C][B(C₆F₅)₄]   | 10  |
| 36 | 60  | Structure represented by formula 25 | 10 | [PhNHMe₂][B(C₆F₅)₄]| 10  |
| 37 | 25  | Structure represented by formula 26 | 10 | [Ph₃C][BPh₄]       | 10  |
| 38 | 0   | Structure represented by formula 27 | 10 | [PhNHMe₂][BPh₄]    | 20  |
| 39 | 80  | Structure represented by formula 27 | 10 | B(C₆F₅)₃           | 10  |
| 40 | 0   | Structure represented by formula 28 | 10 | [Ph₃C][B(C₆F₅)₄]   | 10  |
| 41 | 40  | Structure represented by formula 28 | 10 | [PhNHMe₂][B(C₆F₅)₄]| 10  |

| Example | Organoaluminum compound | Usage amount of organoaluminum compound/µmol | Solvent       | Molar concentration of rare earth complex/mmolL⁻¹ |
|---------|-------------------------|----------------------------------------------|---------------|---------------------------------------------------|
| 2       | Triisobutyl aluminum    | 100                                          | Chlorobenzene | 0.67                                              |
| 3       | Triisobutyl aluminum    | 100                                          | Toluene       | 0.67                                              |
| 4       | Triisobutyl aluminum    | 100                                          | Toluene       | 0.67                                              |
| 5       | Triisobutyl aluminum    | 100                                          | Chlorobenzene | 0.67                                              |
| 6       | Triisobutyl aluminum    | 100                                          | Toluene       | 0.67                                              |
| 7       | Triethyl aluminum       | 200                                          | Hexane        | 1.0                                               |
| 8       | Triisobutyl aluminum    | 100                                          | Toluene       | 1.0                                               |
| 9       | Triisobutyl aluminum    | 100                                          | Pentane       | 0.5                                               |
| 10      | Triisobutyl aluminum    | 1                                            | Xylene        | 1.0                                               |
| 11      | Triisobutyl aluminum    | 10                                           | Hexane        | 0.2                                               |

TABLE 1-continued

The Raw material proportions and the reaction conditions of Examples 2 to 41

| | | | |
|---|---|---|---|
| 12 | Triisobutyl aluminum | 5 | Hexane | 0.25 |
| 13 | Triisobutyl aluminum | 100 | Hexane | 0.2 |
| 14 | Triisobutyl aluminum | 500 | Xylene | 0.25 |
| 15 | Trimethyl aluminum | 100 | Toluene | 0.33 |
| 16 | Trimethyl aluminum | 100 | Xylene | 0.25 |
| 17 | Triisobutyl aluminum | 100 | Hexane | 0.25 |
| 18 | Methyl alumoxane | 30 | Toluene | 0.2 |
| 19 | Hydrogenated diisobutyl aluminum | 20 | Chlorobenzene | 0.2 |
| 20 | Triisobutyl aluminum | 100 | Hexane | 0.2 |
| 21 | Triisobutyl aluminum | 200 | Toluene | 0.67 |
| 22 | Triethyl aluminum | 200 | Toluene | 0.5 |
| 23 | Diethyl aluminum chloride | 100 | Hexane | 0.28 |
| 24 | Hydrogenated diisobutyl aluminum | 500 | Chlorobenzene | 0.5 |
| 25 | Triisobutyl aluminum | 100 | Pentane | 0.2 |
| 26 | Trimethyl aluminum | 100 | Pentane | 0.25 |
| 27 | Triisobutyl aluminum | 100 | Toluene | 2.0 |
| 28 | Methyl alumoxane | 100 | Chlorobenzene | 0.67 |
| 29 | Triisobutyl aluminum | 100 | Toluene | 0.67 |
| 30 | Triisobutyl aluminum | 100 | Xylene | 0.67 |
| 31 | Triisobutyl aluminum | 100 | Toluene | 0.67 |
| 32 | Trimethyl aluminum | 100 | Chlorobenzene | 0.67 |
| 33 | Triethyl aluminum | 200 | Toluene | 1.0 |
| 34 | Diethyl aluminum chloride | 100 | Toluene | 1.0 |
| 35 | Hydrogenated diisobutyl aluminum | 100 | Xylene | 0.5 |
| 36 | Triisobutyl aluminum | 100 | Pentane | 1.0 |
| 37 | Triisobutyl aluminum | 100 | Hexane | 0.2 |
| 38 | Triisobutyl aluminum | 100 | Hexane | 0.25 |
| 39 | Triisobutyl aluminum | 100 | Hexane | 0.2 |
| 40 | Triisobutyl aluminum | 200 | Xylene | 0.25 |
| 41 | Trimethyl aluminum | 100 | Toluene | 0.33 |

Preparation Examples of the Functionalized Highly Syndiotactic Polystyrene Comprising a Repeating Unit Having a Structure Represented by Formula (I)

Example 42

5 mL of the catalyst solution prepared in Example 1 was placed in a polymerization flask which had been treated for removing water and air, 5.0 mmol of the functionalized styrene having a structure represented by formula A was added to the polymerization flask, and a polymerization reaction was performed at 25° C. for 0.4 hours. After the completion of the polymerization reaction, 2 mL of a hydrochloric acid ethanol solution having a volume concentration of 10% was added to the polymerization flask to terminate the polymerization reaction. The resultant reaction solution was poured into 100 mL of methanol for settling and the resultant settled product was dried in a vacuum drying tank for 48 hours to obtain 0.67 g of the functionalized highly syndiotactic polystyrene.

The functionalized highly syndiotactic polystyrene prepared in Example 42 of this disclosure was subjected to detection of carbon nuclear magnetic resonance spectrum, and the detection results were as shown in FIG. 1. FIG. 1 shows a carbon nuclear magnetic resonance spectrogram of the functionalized highly syndiotactic polystyrene prepared in Example 42 of this disclosure. It can be known from FIG. 1 that the functionalized highly syndiotactic polystyrene prepared in Example 42 of this disclosure comprises a repeating unit having a structure represented by formula 29:

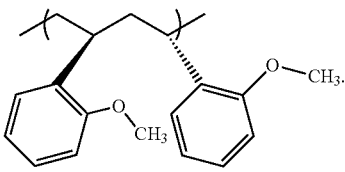

formula 29

The conversion rate of the preparation method of the functionalized highly syndiotactic polystyrene provided by Example 42 of this disclosure was tested according to the method in the technical solutions described above, as well as the syndiotacticity selectivity, the number average molecular weight, the molecular weight distribution, the melting point, and the contact angle of the functionalized highly syndiotactic polystyrene prepared in Example 42 of this disclosure. The test results were as shown in Table 2. Table 2 shows the conversion rates of the preparation methods of functionalized highly syndiotactic polystyrenes provided by Example 42 to Example 101 of this disclosure and test results of properties of the functionalized highly syndiotactic polystyrenes prepared in Example 42 to Example 101 of this disclosure.

Table 2. The conversion rates of the preparation methods of the functionalized highly syndiotactic polystyrenes provided by Example 42 to Example 101 of this disclosure and test results of properties of the functionalized highly syndiotactic polystyrenes prepared in Example 42 to Example 101 of this disclosure.

| Example | Conversion rate (%) | Syndiotacticity selectivity of functionalized styrene (rrrr) | Number average molecular weight ($\times 10^{-4}$) | Molecular weight distribution | Melting point (° C.) | Contact angle (°) |
|---|---|---|---|---|---|---|
| 42 | 100 | >99% | 7.59 | 1.34 | 240 | 90.2 |
| 43 | 100 | >99% | 2.13 | 1.26 | 176 | 84.9 |
| 44 | 100 | >99% | 6.87 | 1.39 | 175 | 84.8 |
| 45 | 100 | >99% | 19.6 | 1.46 | 176 | 84.9 |
| 46 | 100 | >99% | 36.4 | 1.51 | 175 | 85.0 |
| 47 | 100 | >99% | 163.2 | 1.68 | 176 | 84.9 |
| 48 | 100 | >99% | 293.7 | 1.84 | 176 | 84.8 |
| 49 | 100 | >99% | 23.1 | 1.37 | 176 | 85.0 |
| 50 | 100 | >99% | 20.7 | 1.41 | 175 | 84.9 |
| 51 | 100 | >99% | 20.5 | 1.43 | 176 | 84.9 |
| 52 | 100 | >99% | 18.1 | 1.83 | 176 | 84.7 |
| 53 | 100 | >99% | 16.8 | 1.97 | 175 | 84.8 |
| 54 | 100 | >99% | 15.2 | 2.06 | 176 | 84.9 |
| 55 | 100 | >99% | 6.49 | 2.17 | 237 | 84.0 |
| 56 | 100 | >99% | 7.19 | 1.92 | 257 | 91.3 |
| 57 | 100 | >99% | 6.81 | 1.18 | 216 | — |
| 58 | 100 | >99% | 7.64 | 1.56 | — | — |
| 59 | 100 | >99% | 8.26 | 1.67 | — | — |
| 60 | 100 | >99% | 8.61 | 1.43 | — | — |
| 61 | 100 | >99% | 7.16 | 1.52 | — | — |
| 62 | 100 | >99% | 6.94 | 1.79 | — | 81.7 |
| 63 | 100 | >99% | 4.23 | 1.83 | — | — |
| 64 | 100 | >99% | 7.59 | 1.74 | — | — |
| 65 | 100 | >92% | 8.16 | 1.69 | — | — |
| 66 | 100 | >90% | 1.97 | 1.93 | — | — |
| 67 | 100 | >99% | 1.19 | 1.67 | 320 | — |
| 68 | 100 | >99% | 1.87 | 1.72 | 235 | — |
| 69 | 100 | >99% | 8.92 | 1.81 | — | — |
| 70 | 100 | >99% | 4.37 | 1.93 | — | — |
| 71 | 100 | >99% | 9.06 | 1.87 | — | — |
| 72 | 100 | >99% | 7.39 | 1.51 | 252 | — |
| 73 | 100 | >99% | 9.48 | 1.63 | 315 | — |
| 74 | 100 | >99% | 2.98 | 1.73 | 265 | — |
| 75 | 100 | >99% | 18.8 | 1.71 | 261 | — |
| 76 | 100 | >99% | 9.56 | 1.83 | 290 | — |
| 77 | 100 | >99% | 5.73 | 1.29 | 240 | 90.1 |
| 78 | 100 | >99% | 11.7 | 1.52 | 176 | 85.0 |
| 79 | 100 | >99% | 6.27 | 2.04 | 237 | 83.9 |
| 80 | 100 | >99% | 3.01 | 1.87 | 256 | 91.2 |
| 81 | 100 | >99% | 2.64 | 1.24 | 216 | 90.1 |
| 82 | 100 | >99% | 7.46 | 1.61 | — | — |
| 83 | 100 | >99% | 8.03 | 1.63 | — | — |
| 84 | 100 | >99% | 1.86 | 1.49 | — | — |
| 85 | 100 | >99% | 1.47 | 1.58 | — | — |
| 86 | 100 | >99% | 7.18 | 1.84 | — | 81.6 |
| 87 | 100 | >99% | 7.25 | 1.90 | — | — |
| 88 | 100 | >99% | 7.71 | 1.83 | — | — |
| 89 | 100 | >92% | 8.39 | 1.77 | — | — |
| 90 | 100 | >90% | 9.12 | 1.89 | — | — |
| 91 | 100 | >99% | 8.99 | 1.61 | 319 | — |
| 92 | 100 | >99% | 6.81 | 1.67 | 235 | — |
| 93 | 100 | >99% | 5.71 | 1.75 | — | — |
| 94 | 100 | >99% | 9.19 | 1.96 | — | — |
| 95 | 100 | >99% | 9.37 | 1.82 | — | — |
| 96 | 100 | >99% | 7.18 | 1.59 | 251 | — |
| 97 | 100 | >99% | 9.15 | 1.66 | 316 | — |
| 98 | 100 | >99% | 8.09 | 1.79 | 265 | — |
| 99 | 100 | >99% | 8.58 | 1.69 | 260 | — |
| 100 | 100 | >99% | 5.47 | 1.76 | 289 | — |
| 101 | 100 | >99% | 6.95 | 1.88 | 258 | — |

It can be known from Table 2 that the conversion rates of the preparation methods of the functionalized highly syndiotactic polystyrenes provided by Examples of this disclosure are relatively high. Furthermore, the functionalized highly syndiotactic polystyrenes prepared in Examples of this disclosure has higher syndiotacticity selectivities. Meanwhile, the functionalized highly syndiotactic polystyrenes prepared in Examples of this disclosure has smaller contact angles and better polarities.

Example 43 to Example 101

According to the method of Example 42, the functionalized highly syndiotactic polystyrenes were prepared respectively using conditions in Table 3. Table 3 shows the conditions under which functionalized highly syndiotactic polystyrenes were prepared in Example 43 to Example 101. The conversion rates of the preparation methods of functionalized highly syndiotactic polystyrenes provided by Examples 43 to 101 of this disclosure were tested according to the method in the technical solutions described above, as well as the syndiotacticity selectivities, the number average molecular weights, the molecular weight distributions, the melting points, and the contact angles of the functionalized highly syndiotactic polystyrenes prepared in Examples 43 to 101 of this disclosure. The test results were as shown in Table 2.

Figure 2:
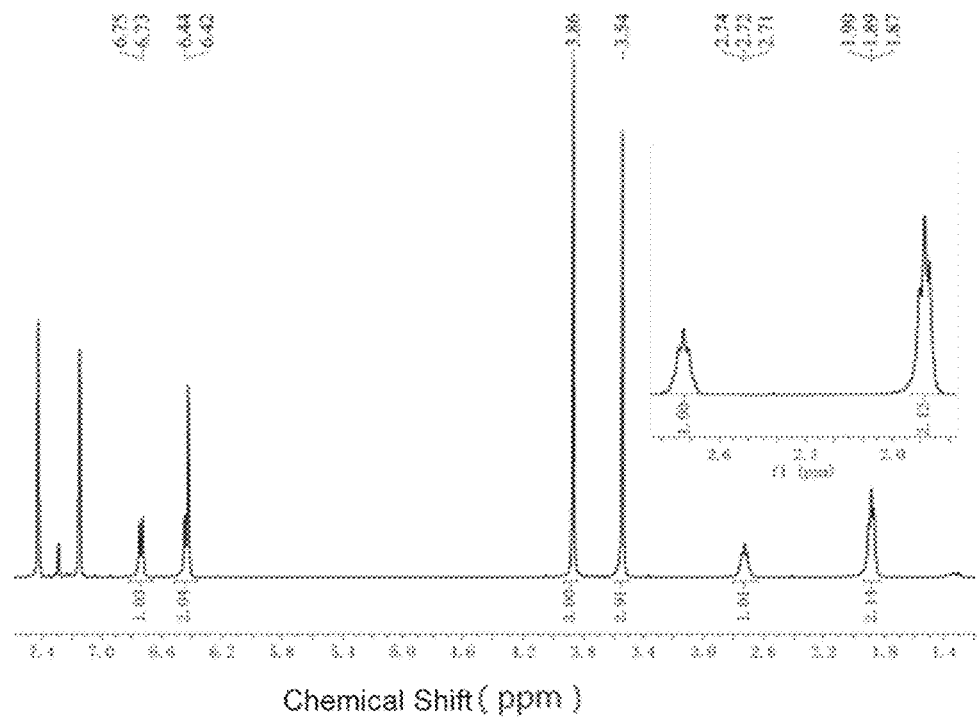
FIG. 2 is a hydrogen nuclear magnetic resonance spectrogram of the functionalized highly syndiotactic polystyrene prepared in Example 62 of this disclosure.

The functionalized highly syndiotactic polystyrene prepared in Example 62 of this disclosure was subjected to detection of hydrogen nuclear magnetic resonance spectrum, and the detection result was as shown in FIG. 2. FIG. 2 shows a hydrogen nuclear magnetic resonance spectrogram of the functionalized highly syndiotactic polystyrene prepared in Example 62 of this disclosure. It can be known from FIG. 2 that the functionalized highly syndiotactic polystyrene prepared in Example 62 of this disclosure has a structure represented by formula 30:

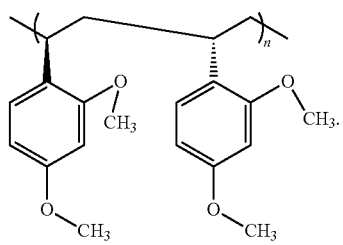

formula 30

TABLE 3

Conditions under which the functionalized highly syndiotactic polystyrenes were prepared in Example 43 to Example 101

| Example | Catalyst solution | Functionalized styrene | Molar ratio of functionalized styrene and rare earth complex | Polymerization temperature (° C.) | Polymerization time (h) |
|---|---|---|---|---|---|
| 43 | Prepared in Example 1 | Having a structure represented by formula B | 50:1 | 25 | 0.1 |
| 44 | Prepared in Example 1 | Having a structure represented by formula B | 150:1 | 25 | 0.1 |
| 45 | Prepared in Example 1 | Having a structure represented by formula B | 500:1 | 25 | 0.3 |
| 46 | Prepared in Example 1 | Having a structure represented by formula B | 1000:1 | 25 | 0.5 |
| 47 | Prepared in Example 1 | Having a structure represented by formula B | 5000:1 | 25 | 1 |
| 48 | Prepared in Example 1 | Having a structure represented by formula B | 10000:1 | 25 | 2 |
| 49 | Prepared in Example 2 | Having a structure represented by formula B | 500:1 | −60 | 1 |
| 50 | Prepared in Example 2 | Having a structure represented by formula B | 500:1 | −20 | 0.5 |
| 51 | Prepared in Example 2 | Having a structure represented by formula B | 500:1 | 0 | 0.3 |
| 52 | Prepared in Example 2 | Having a structure represented by formula B | 500:1 | 40 | 0.1 |
| 53 | Prepared in Example 2 | Having a structure represented by formula B | 500:1 | 60 | 0.1 |
| 54 | Prepared in Example 2 | Having a structure represented by formula B | 500:1 | 80 | 0.1 |
| 55 | Prepared in Example 3 | Having a structure represented by formula C | 500:1 | 25 | 1 |
| 56 | Prepared in Example 3 | Having a structure represented by formula D | 500:1 | 25 | 0.5 |
| 57 | Prepared in Example 4 | Having a structure represented by formula E | 500:1 | 25 | 0.5 |
| 58 | Prepared in Example 4 | Having a structure represented by formula F | 500:1 | 25 | 0.5 |
| 59 | Prepared in Example 5 | Having a structure represented by formula G | 500:1 | 25 | 2 |
| 60 | Prepared in Example 5 | Having a structure represented by formula H | 500:1 | 25 | 2 |
| 61 | Prepared in Example 6 | Having a structure represented by formula I | 500:1 | 25 | 6 |
| 62 | Prepared in Example 6 | Having a structure represented by formula J | 500:1 | 25 | 6 |
| 63 | Prepared in Example 7 | Having a structure represented by formula K | 500:1 | 25 | 6 |
| 64 | Prepared in Example 8 | Having a structure represented by formula M | 500:1 | 25 | 12 |
| 65 | Prepared in Example 9 | Having a structure represented by formula N | 500:1 | 25 | 24 |
| 66 | Prepared in Example 10 | Having a structure represented by formula O | 500:1 | 25 | 48 |

TABLE 3-continued

Conditions under which the functionalized highly syndiotactic polystyrenes were prepared in Example 43 to Example 101

| Example | Catalyst solution | Functionalized styrene | Molar ratio of functionalized styrene and rare earth complex | Polymerization temperature (° C.) | Polymerization time (h) |
|---|---|---|---|---|---|
| 67 | Prepared in Example 11 | Having a structure represented by formula P | 500:1 | 25 | 0.5 |
| 68 | Prepared in Example 12 | Having a structure represented by formula Q | 500:1 | 25 | 2 |
| 69 | Prepared in Example 13 | Having a structure represented by formula S | 500:1 | 25 | 3 |
| 70 | Prepared in Example 14 | Having a structure represented by formula T | 500:1 | 25 | 1 |
| 71 | Prepared in Example 15 | Having a structure represented by formula U | 500:1 | 25 | 1 |
| 72 | Prepared in Example 16 | Having a structure represented by formula U | 500:1 | 25 | 1 |
| 73 | Prepared in Example 17 | Having a structure represented by formula V | 500:1 | 25 | 0.1 |
| 74 | Prepared in Example 18 | Having a structure represented by formula W | 500:1 | 25 | 0.1 |
| 75 | Prepared in Example 19 | Having a structure represented by formula X | 500:1 | 25 | 0.1 |
| 76 | Prepared in Example 20 | Having a structure represented by formula X | 500:1 | 25 | 0.5 |
| 77 | Prepared in Example 21 | Having a structure represented by formula A | 500:1 | 25 | 0.4 |
| 78 | Prepared in Example 22 | Having a structure represented by formula B | 500:1 | 25 | 0.1 |
| 79 | Prepared in Example 23 | Having a structure represented by formula C | 500:1 | 25 | 1 |
| 80 | Prepared in Example 24 | Having a structure represented by formula D | 500:1 | 25 | 0.5 |
| 81 | Prepared in Example 24 | Having a structure represented by formula E | 500:1 | 25 | 0.5 |
| 82 | Prepared in Example 25 | Having a structure represented by formula F | 500:1 | 25 | 0.5 |
| 83 | Prepared in Example 25 | Having a structure represented by formula G | 500:1 | 25 | 2 |
| 84 | Prepared in Example 26 | Having a structure represented by formula H | 500:1 | 25 | 2 |
| 85 | Prepared in Example 26 | Having a structure represented by formula I | 500:1 | 25 | 6 |
| 86 | Prepared in Example 27 | Having a structure represented by formula J | 500:1 | 25 | 6 |
| 87 | Prepared in Example 27 | Having a structure represented by formula K | 500:1 | 25 | 6 |
| 88 | Prepared in Example 28 | Having a structure represented by formula M | 500:1 | 25 | 12 |
| 89 | Prepared in Example 29 | Having a structure represented by formula N | 500:1 | 25 | 24 |
| 90 | Prepared in Example 30 | Having a structure represented by formula O | 500:1 | 25 | 48 |
| 91 | Prepared in Example 31 | Having a structure represented by formula P | 500:1 | 25 | 0.5 |
| 92 | Prepared in Example 32 | Having a structure represented by formula Q | 500:1 | 25 | 2 |
| 93 | Prepared in Example 33 | Having a structure represented by formula S | 500:1 | 25 | 3 |
| 94 | Prepared in Example 34 | Having a structure represented by formula T | 500:1 | 25 | 1 |
| 95 | Prepared in Example 35 | Having a structure represented by formula U | 500:1 | 25 | 1 |
| 96 | Prepared in Example 36 | Having a structure represented by formula V | 500:1 | 25 | 1 |
| 97 | Prepared in Example 37 | Having a structure represented by formula W | 500:1 | 25 | 0.1 |
| 98 | Prepared in Example 38 | Having a structure represented by formula W | 500:1 | 25 | 0.1 |
| 99 | Prepared in Example 39 | Having a structure represented by formula X | 500:1 | 25 | 0.1 |

TABLE 3-continued

Conditions under which the functionalized highly syndiotactic polystyrenes were prepared in Example 43 to Example 101

| Example | Catalyst solution | Functionalized styrene | Molar ratio of functionalized styrene and rare earth complex | Polymerization temperature (° C.) | Polymerization time (h) |
|---|---|---|---|---|---|
| 100 | Prepared in Example 40 | Having a structure represented by formula X | 500:1 | 25 | 0.5 |
| 101 | Prepared in Example 41 | Having a structure represented by formula D | 500:1 | 25 | 0.5 |

Preparation Examples of the Functionalized Highly Syndiotactic Polystyrene Comprising a Repeating Unit Having a Structure Represented by Formula (I) and a Structure Represented by Formula (II)

Example 102

5 mL of the catalyst solution prepared in Example 1 was taken and placed in a polymerization flask which had bend treated for removing water and air, 5.0 mmol of a functionalized styrene monomer A and 5.0 mmol of a styrene monomer were further added, and polymerization reaction was performed at 25° C. for 4 hours; 2 mL of a hydrochloric acid ethanol solution having a volume concentration of 10% was then added to terminate the polymerization reaction, and the reaction solution was poured into 100 mL of methanol for settling to obtain a copolymer of styrene and methoxy functionalized styrene; and the resultant polymer was placed in a vacuum drying tank and dried for 48 hours to obtain a dry constant-weight copolymer of styrene and methoxy functionalized styrene with a net weight of 1.19 g. The total conversion rate was 95%. The contact angle was 92.1°.

The resultant copolymer of styrene and methoxy functionalized styrene was analyzed using hydrogen nuclear magnetic resonance spectrum ($^1$H NMR) and carbon nuclear magnetic resonance spectrum ($^{13}$C NMR), and the results indicated that its syndiotacticity was greater than 99%; its insertion rate of functionalized styrene monomers in the copolymer was 54%; and it had a number average molecular weight ($M_n$) of 236 thousand and a molecular weight distribution ($M_w/M_n$) of 1.19 obtained by GPC analysis.

Examples 103 to 162

According to the method of Example 102, copolymers of styrene and functionalized styrene were prepared respectively using the raw material proportions and the reaction conditions in Table 4 respectively. Table 4 is a collection of the raw material proportions, the reaction conditions, and the test results of properties of Examples 103 to 162 of this disclosure. The numbers in the column of the catalyst represent the catalysts prepared in the Examples.

TABLE 4

Collection of the raw material proportions, the reaction conditions, and the test results of properties of Examples 103 to 162 of this disclosure.

| Example | Catalyst | Functionalized styrene monomer | Molar ratio of functionalized styrene monomer, styrene monomer, and catalyst | Polymerization temperature (° C.) | Polymerization time (h) | Conversion rate (%) | Insertion rate of functionalized styrene in copolymer |
|---|---|---|---|---|---|---|---|
| 103 | 1 | B | 10000/50/1 | 25 | 24 | 100 | 99% |
| 104 | 1 | B | 9000/1000/1 | 25 | 24 | 98 | 91% |
| 105 | 1 | B | 7000/3000/1 | 25 | 24 | 96 | 73% |
| 106 | 1 | B | 5000/5000/1 | 25 | 24 | 94 | 53% |
| 107 | 1 | B | 3000/7000/1 | 25 | 24 | 97 | 32% |
| 108 | 1 | B | 1000/9000/1 | 25 | 24 | 98 | 12% |
| 109 | 1 | B | 50/10000/1 | 25 | 24 | 100 | 1% |
| 110 | 2 | B | 500/500/1 | −60 | 5 | 96 | 52% |
| 111 | 2 | B | 500/500/1 | −20 | 2 | 90 | 59% |
| 112 | 2 | B | 500/500/1 | 0 | 1 | 92 | 57% |
| 113 | 2 | B | 500/500/1 | 40 | 0.5 | 97 | 52% |
| 114 | 2 | B | 500/500/1 | 60 | 0.5 | 98 | 51% |
| 115 | 2 | B | 500/500/1 | 80 | 0.5 | 98 | 51% |
| 116 | 3 | C | 1000/1000/1 | 25 | 8 | 96 | 53% |
| 117 | 3 | D | 2000/1000/1 | 25 | 6 | 98 | 68% |
| 118 | 4 | E | 2000/2000/1 | 25 | 10 | 96 | 54% |
| 119 | 4 | F | 3000/3000/1 | 25 | 15 | 91 | 58% |
| 120 | 5 | G | 4000/4000/1 | 25 | 24 | 87 | 61% |
| 121 | 5 | H | 500/500/1 | 25 | 8 | 93 | 56% |
| 122 | 6 | I | 500/500/1 | 25 | 12 | 89 | 60% |
| 123 | 6 | J | 500/500/1 | 25 | 12 | 91 | 57% |
| 124 | 7 | K | 500/500/1 | 25 | 12 | 85 | 63% |
| 125 | 8 | M | 500/500/1 | 25 | 24 | 81 | 65% |
| 126 | 9 | N | 500/500/1 | 25 | 48 | 75 | 69% |
| 127 | 10 | O | 500/500/1 | 25 | 48 | 71 | 71% |
| 128 | 11 | P | 500/500/1 | 25 | 2 | 96 | 53% |
| 129 | 12 | Q | 500/500/1 | 25 | 8 | 97 | 52% |

TABLE 4-continued

Collection of the raw material proportions, the reaction conditions, and the test results of properties of Examples 103 to 162 of this disclosure.

| | | | | | | | |
|---|---|---|---|---|---|---|---|
| 130 | 13 | S | 500/500/1 | 25 | 10 | 94 | 55% |
| 131 | 14 | T | 500/500/1 | 25 | 4 | 98 | 51% |
| 132 | 15 | U | 500/500/1 | 25 | 4 | 92 | 56% |
| 133 | 16 | V | 500/500/1 | 25 | 4 | 95 | 54% |
| 134 | 17 | C | 500/500/1 | 25 | 5 | 94 | 54% |
| 135 | 18 | D | 500/500/1 | 25 | 5 | 97 | 52% |
| 136 | 19 | E | 500/500/1 | 25 | 5 | 93 | 55% |
| 137 | 20 | F | 500/500/1 | 25 | 10 | 89 | 59% |
| 138 | 21 | A | 500/500/1 | 25 | 2 | 96 | 53% |
| 139 | 22 | B | 500/500/1 | 25 | 0.5 | 97 | 52% |
| 140 | 23 | C | 500/500/1 | 25 | 4 | 95 | 54% |
| 141 | 24 | D | 500/500/1 | 25 | 2 | 98 | 51% |
| 142 | 24 | E | 500/500/1 | 25 | 2 | 95 | 53% |
| 143 | 25 | F | 500/500/1 | 25 | 2 | 92 | 57% |
| 144 | 25 | G | 500/500/1 | 25 | 8 | 88 | 61% |
| 145 | 26 | H | 500/500/1 | 25 | 8 | 92 | 56% |
| 146 | 26 | I | 500/500/1 | 25 | 12 | 90 | 59% |
| 147 | 27 | J | 500/500/1 | 25 | 12 | 91 | 59% |
| 148 | 27 | K | 500/500/1 | 25 | 12 | 86 | 62% |
| 149 | 28 | M | 500/500/1 | 25 | 24 | 80 | 65% |
| 150 | 29 | N | 500/500/1 | 25 | 48 | 76 | 69% |
| 151 | 30 | O | 500/500/1 | 25 | 48 | 72 | 71% |
| 152 | 31 | P | 500/500/1 | 25 | 2 | 96 | 52% |
| 153 | 32 | Q | 500/500/1 | 25 | 7 | 96 | 53% |
| 154 | 33 | S | 500/500/1 | 25 | 10 | 93 | 56% |
| 155 | 34 | T | 500/500/1 | 25 | 4 | 97 | 52% |
| 156 | 35 | U | 500/500/1 | 25 | 4 | 91 | 58% |
| 157 | 36 | V | 500/500/1 | 25 | 4 | 96 | 53% |
| 158 | 37 | A | 500/500/1 | 25 | 4 | 95 | 54% |
| 159 | 38 | B | 500/500/1 | 25 | 0.5 | 96 | 53% |
| 160 | 39 | C | 500/500/1 | 25 | 4 | 94 | 55% |
| 161 | 40 | D | 500/500/1 | 25 | 3 | 98 | 51% |
| 162 | 41 | D | 500/500/1 | 25 | 3 | 97 | 52% |

| Example | Syndiotacticity selectivity of structural units of functionalized styrene in copolymer (rrrr) | Syndiotacticity selectivity of structural units of styrene in copolymer (rrrr) | $M_n$ ×10$^{-4}$ | $M_w/M_n$ | $T_m$ (° C.) | Contact angle (°) |
|---|---|---|---|---|---|---|
| 103 | >99% | >99% | 241.3 | 1.24 | 169 | 85.4 |
| 104 | >99% | >99% | 237.1 | 1.35 | — | 87.2 |
| 105 | >99% | >99% | 220.6 | 1.43 | — | 88.9 |
| 106 | >99% | >99% | 212.7 | 1.54 | — | 90.5 |
| 107 | >99% | >99% | 206.4 | 1.64 | — | 92.1 |
| 108 | >99% | >99% | 197.5 | 1.73 | 224 | 93.8 |
| 109 | >99% | >99% | 203.9 | 1.89 | 269 | 95.6 |
| 110 | >99% | >99% | 31.1 | 1.32 | — | 90.6 |
| 111 | >99% | >99% | 29.7 | 1.43 | — | 89.8 |
| 112 | >99% | >99% | 28.5 | 1.45 | — | 90.2 |
| 113 | >99% | >99% | 26.1 | 1.87 | — | 90.4 |
| 114 | >99% | >99% | 24.8 | 1.96 | — | 90.6 |
| 115 | >99% | >99% | 21.2 | 2.08 | — | 90.7 |
| 116 | >99% | >99% | 43.9 | 2.16 | — | 89.5 |
| 117 | >99% | >99% | 71.9 | 1.94 | — | 93.3 |
| 118 | >99% | >99% | 96.1 | 1.21 | — | 92.2 |
| 119 | >99% | >99% | 137.6 | 1.53 | — | n.d. |
| 120 | >99% | >99% | 168.2 | 1.62 | — | n.d. |
| 121 | >99% | >99% | 18.1 | 1.41 | — | n.d. |
| 122 | >99% | >99% | 17.6 | 1.50 | — | n.d. |
| 123 | >99% | >99% | 16.4 | 1.71 | — | n.d. |
| 124 | >96% | >99% | 12.3 | 1.83 | — | n.d. |
| 125 | >94% | >99% | 15.9 | 1.76 | — | n.d. |
| 126 | >92% | >99% | 16.6 | 1.61 | — | n.d. |
| 127 | >90% | >99% | 3.97 | 1.90 | — | n.d. |
| 128 | >99% | >99% | 3.19 | 1.62 | — | n.d. |
| 129 | >99% | >99% | 3.87 | 1.79 | — | n.d. |
| 130 | >99% | >99% | 19.2 | 1.84 | — | n.d. |
| 131 | >99% | >99% | 9.37 | 1.95 | — | n.d. |
| 132 | >99% | >99% | 19.6 | 1.81 | — | n.d. |
| 133 | >99% | >99% | 13.9 | 1.56 | — | n.d. |
| 134 | >99% | >99% | 19.8 | 1.61 | — | n.d. |
| 135 | >99% | >99% | 5.98 | 1.74 | — | n.d. |
| 136 | >99% | >99% | 35.8 | 1.79 | — | n.d. |
| 137 | >99% | >99% | 19.6 | 1.89 | — | n.d. |
| 138 | >99% | >99% | 15.3 | 1.21 | — | n.d. |
| 139 | >99% | >99% | 23.7 | 1.57 | — | n.d. |

TABLE 4-continued

Collection of the raw material proportions, the reaction conditions, and the test results of properties of Examples 103 to 162 of this disclosure.

| | | | | | | |
|---|---|---|---|---|---|---|
| 140 | >99% | >99% | 12.7 | 2.09 | — | n.d. |
| 141 | >99% | >99% | 6.01 | 1.81 | — | n.d. |
| 142 | >99% | >99% | 5.64 | 1.23 | — | n.d. |
| 143 | >99% | >99% | 14.6 | 1.64 | — | n.d. |
| 144 | >99% | >99% | 16.3 | 1.60 | — | n.d. |
| 145 | >99% | >99% | 3.86 | 1.41 | — | n.d. |
| 146 | >99% | >99% | 3.47 | 1.52 | — | n.d. |
| 147 | >99% | >99% | 14.8 | 1.89 | — | n.d. |
| 148 | >96% | >99% | 15.5 | 1.98 | — | n.d. |
| 149 | >94% | >99% | 14.1 | 1.81 | — | n.d. |
| 150 | >92% | >99% | 16.9 | 1.73 | — | n.d. |
| 151 | >90% | >99% | 18.2 | 1.87 | — | n.d. |
| 152 | >99% | >99% | 17.9 | 1.62 | — | n.d. |
| 153 | >99% | >99% | 13.1 | 1.69 | — | n.d. |
| 154 | >99% | >99% | 11.1 | 1.71 | — | n.d. |
| 155 | >99% | >99% | 17.9 | 1.92 | — | n.d. |
| 156 | >99% | >99% | 19.7 | 1.86 | — | n.d. |
| 157 | >99% | >99% | 15.8 | 1.50 | — | n.d. |
| 158 | >99% | >99% | 17.5 | 1.64 | — | n.d. |
| 159 | >99% | >99% | 16.9 | 1.75 | — | n.d. |
| 160 | >99% | >99% | 15.8 | 1.67 | — | n.d. |
| 161 | >99% | >99% | 11.7 | 1.82 | — | n.d. |
| 162 | >99% | >99% | 12.5 | 1.93 | — | n.d. |

Note:
"n.d." in Table 4 represents "not detected"

Figure 3:
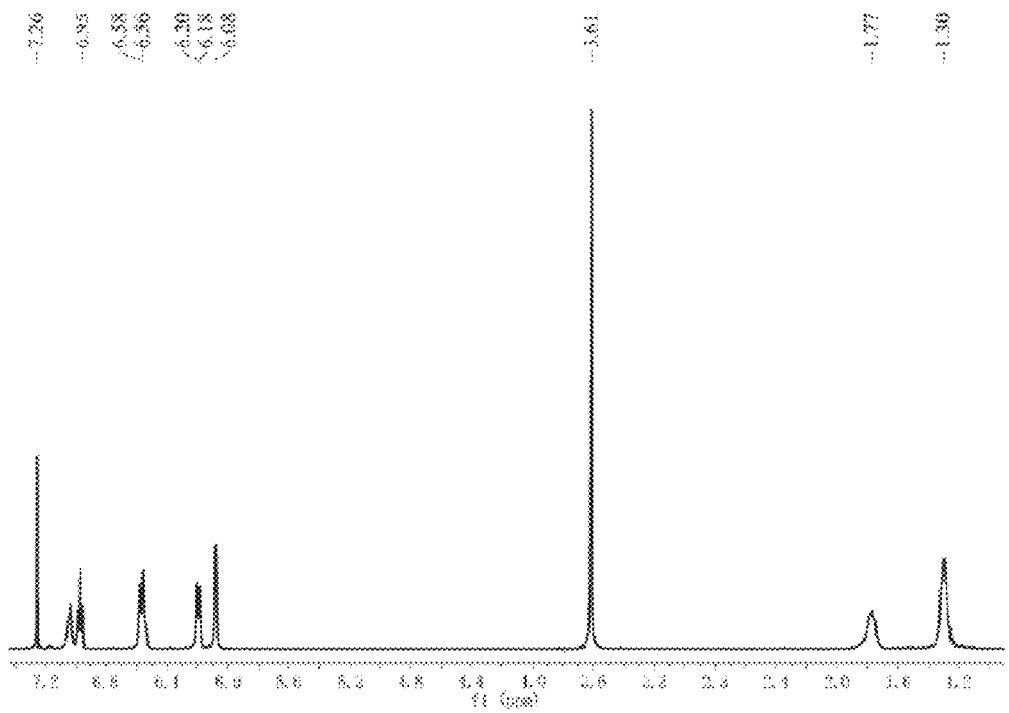
FIG. 3 is a hydrogen nuclear magnetic resonance spectrogram of a copolymer of styrene and methoxy functionalized styrene prepared in Example 105 of this disclosure.
Figure 4:
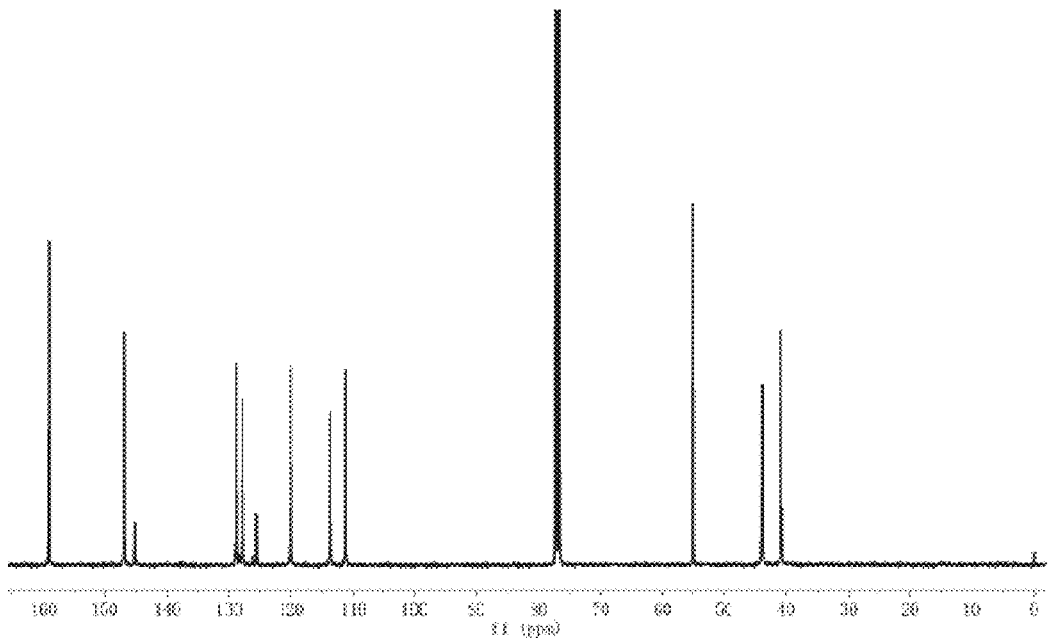
FIG. 4 is a carbon nuclear magnetic resonance spectrogram of a copolymer of styrene and methoxy functionalized styrene prepared in Example 105 of this disclosure.

The copolymer of styrene and m-methoxy functionalized styrene prepared in Example 105 of this disclosure was subjected to detection of hydrogen and carbon nuclear magnetic resonance spectra. The detection results can be seen in FIG. 3 and FIG. 4, wherein FIG. 3 shows a hydrogen nuclear magnetic resonance spectrogram of a copolymer of styrene and m-methoxy functionalized styrene prepared in Example 45 of this disclosure; and FIG. 4 shows a carbon nuclear magnetic resonance spectrogram of a copolymer of styrene and m-methoxy functionalized styrene prepared in Example 45 of this disclosure. It can be known from FIG. 3 and FIG. 4 that a copolymer of styrene and m-methoxy functionalized styrene is prepared in this invention, and its syndiotacticity is greater than 99%; and the insertion rate of the m-methoxy functionalized styrene monomers in the copolymer is 73%.

Figure 5:
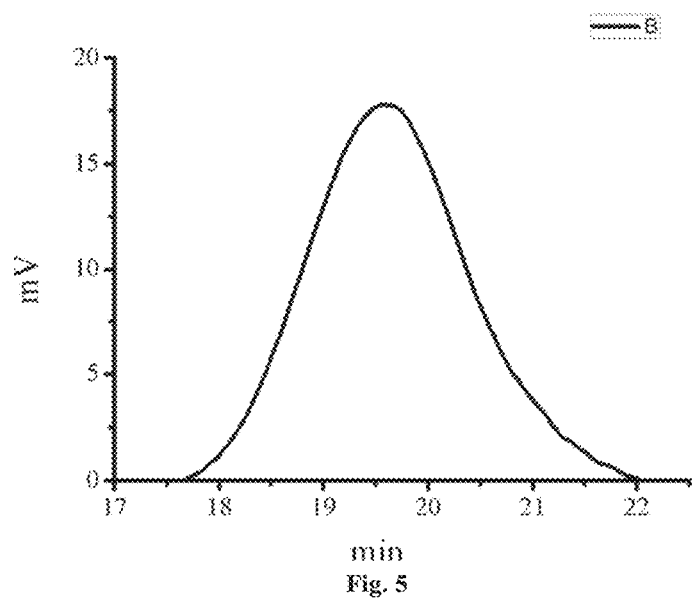
FIG. 5 is a GPC plot of a copolymer of styrene and methoxy functionalized styrene prepared in Example 105 of this disclosure.

The highly syndiotactic copolymer of styrene and m-methoxy functionalized styrene prepared in Example 105 of this disclosure was detected using gel permeation chromatography (GPC), and the result can be seen in FIG. 5. It can be known from FIG. 5 that the copolymer of styrene and methoxy functionalized styrene has a number average molecular weight ($M_n$) of 2206 thousand and a molecular weight distribution ($M_w/M_n$) of 1.43 obtained by GPC analysis.

Figure 6:
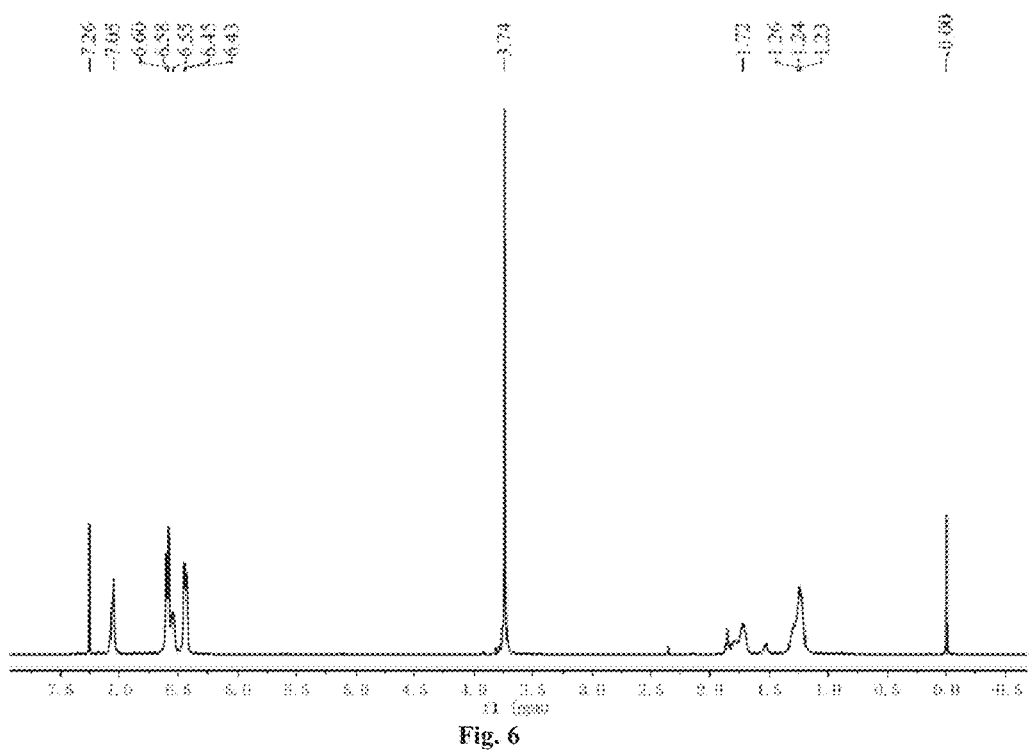
FIG. 6 is a hydrogen nuclear magnetic resonance spectrogram of a copolymer of styrene and methoxy functionalized styrene prepared in Example 116 of this disclosure.

The copolymer of styrene and p-methoxy functionalized styrene prepared in Example 116 of this disclosure was subjected to detection of hydrogen nuclear magnetic resonance spectrum. The detection result can be seen in FIG. 6. It can be known from FIG. 6 that a copolymer of styrene and p-methoxy functionalized styrene is prepared in this invention, and its syndiotacticity is greater than 99%; and the insertion rate of m-methoxy functionalized styrene monomers in the copolymer is 53%.

It can be seen from the above Examples that the functionalized styrene is catalytically subjected to highly syndiotactic homopolymerization and to highly syndiotactic copolymerization with styrene by a method of coordination polymerization using a compound containing a rare earth as a catalyst in this invention, and a functionalized highly syndiotactic polystyrene is successfully prepared, which has a relatively high conversion rate of 71% to 100%; the functionalized highly syndiotactic polystyrene prepared has a number average molecular weight of $1 \times 10^4$ to $300 \times 10^4$, a molecular weight distribution of 1.1 to 3.0, and a syndiotacticity of no less than 90%, and the insertion rate of structural units of functionalized styrene in the copolymer may be arbitrarily regulated by regulating the raw material proportions.

The description of the above Examples is only used to help the understanding of the method of this invention and the core idea thereof. It is to be indicated that, with respect to the person skilled in the art, various improvements and modifications may also be made to this invention without departing from the principle of this invention. These improvements and modifications also fall in the protection scope of the claims of this invention.

What is claimed is:

1. A preparation method of a functionalized syndiotactic polystyrene, comprising:
   performing a polymerization of a functionalized styrene or a polymerization of styrene and a functionalized styrene in the presence of a catalyst to obtain the functionalized syndiotactic polystyrene, wherein the functionalized syndiotactic polystyrene comprises a repeating unit having a structure represented by formula (I), or comprises a repeating unit having a structure represented by formula (I) and a repeating unit having a structure represented formula (II):

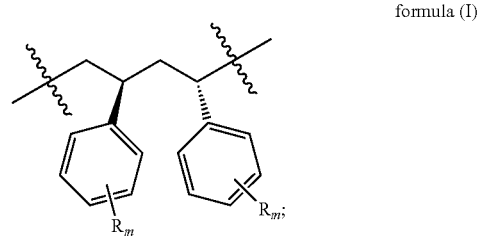

formula (I)

-continued

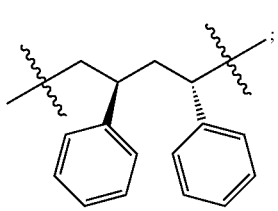

formula (II)

wherein the functionalized styrene has a structure represented by formula (III):

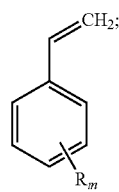

formula (III)

wherein in formula (I) and formula (III),

R is independently selected from a $C_{1-20}$ alkoxy group, a $C_{6-20}$ aryloxy group, a $C_{1-20}$ alkylthio group, a $C_{6-20}$ arylthio group, or a $C_{6-20}$ aryl group;

m is the number of substituent R and is independently selected from an integer from 1 to 5; and the catalyst comprises a rare earth complex, an organoboron compound, and an organoaluminum compound.

2. The preparation method according to claim 1, wherein the rare earth complex has a structure represented by formula (IV) or formula (V):

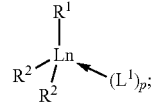

formula (IV)

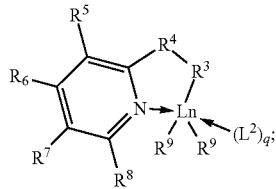

formula (V)

wherein, $R^1$ is selected from any one of a cyclopentadienyl group and derivatives thereof, an indenyl group and derivatives thereof, or a fluorene group and derivatives thereof;

$R^2$ is selected from a $C_{1-10}$ alkyl group, a $C_{1-10}$ silyl group, a $C_{6-10}$ aminoaryl group, a $C_{1-10}$ silylamino group, a $C_{1-10}$ alkylamino group, a $C_{3-10}$ allyl group, or a borohydride group;

$L^1$ is a ligand selected from tetrahydrofuran, ethyl ether, ethylene glycol dimethyl ether, or toluene;

p is the number of $L^1$, wherein $0 \leq p \leq 2$;

$R^3$ is selected from any one of a cyclopentadienyl group and derivatives thereof, an indenyl group and derivatives thereof, or a fluorene group and derivatives thereof;

$R^4$ is selected from a methylene group, an ethylene group, or a dimethylsilyl group;

$R^5$, $R^6$, and $R^7$ are independently selected from hydrogen, a methyl group, an ethyl group, an isopropyl group, a tert-butyl group, or a phenyl group;

$R^8$ is selected from hydrogen, a methyl group, an ethyl group, an isopropyl group, a tert-butyl group, a phenyl group, a 2,6-dimethylphenyl group, a 4-methylphenyl group, a s-trimethylphenyl group, a 2,6-diisopropyl phenyl group, a 2,4,6-triisopropyl phenyl group, or a 2,6-di-tert-butyl phenyl group;

$R^9$ is selected from a $C_{1-10}$ alkyl group, a $C_{1-10}$ silyl group, a $C_{6-10}$ aminoaryl group, a $C_{1-10}$ silylamino group, a $C_{1-10}$ alkylamino group, a $C_{3-10}$ allyl group, or a borohydride group;

$L^2$ is a ligand selected from tetrahydrofuran, ethyl ether, ethylene glycol dimethyl ether, or toluene;

q is the number of $L^2$, wherein $0 \leq q \leq 2$; and

Ln is independently selected from Sc, Y, La, Ce, Pr, Nd, Pm, Sm, Eu, Gd, Tb, Dy, Ho, Er, Tm, Yb, or Lu.

3. The preparation method according to claim 1, wherein the organoboron compound is selected from $[Ph_3C][B(C_6F_5)_4]$, $[PhNMe_2H][BPh_4]$, $[NEt_3H][BPh_4]$, $[PhNMe_2H][B(C_6F_5)_4]$, or $B(C_6F_5)_3$; and the organoaluminum compound is selected from an alkyl aluminum, a hydrogenated alkyl aluminum, a halogenated alkyl aluminum, or an alumoxane.

4. The preparation method according to claim 3, wherein the organoaluminum compound is one or more selected from trimethyl aluminum, triethyl aluminum, tri-n-propyl aluminum, tri-n-butyl aluminum, triisopropyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyldibenzyl aluminum, ethyl di-p-tolyl aluminum, diethylbenzyl aluminum, dimethyl aluminum hydride, diethyl aluminum hydride, di-n-propyl aluminum hydride, di-n-butyl aluminum hydride, diisopropyl aluminum hydride, diisobutyl aluminum hydride, dipentyl aluminum hydride, dihexyl aluminum hydride, dicyclohexyl aluminum hydride, dioctyl aluminum hydride, diphenyl aluminum hydride, di-p-tolyl aluminum hydride, dibenzyl aluminum hydride, ethylbenzyl aluminum hydride, ethyl p-tolyl aluminum hydride, dimethyl aluminum chloride, diethyl aluminum chloride, di-n-propyl aluminum chloride, di-n-butyl aluminum chloride, diisopropyl aluminum chloride, diisobutyl aluminum chloride, dipentyl aluminum chloride, dihexyl aluminum chloride, dicyclohexyl aluminum chloride, dioctyl aluminum chloride, diphenyl aluminum chloride, di-p-tolyl aluminum chloride, dibenzyl aluminum chloride, ethylbenzyl aluminum chloride, ethyl p-tolyl aluminum chloride, methyl alumoxane, ethyl alumoxane, n-propyl alumoxane, and n-butyl alumoxane.

5. The preparation method according to claim 1, wherein the molar ratio of the rare earth complex to the organoboron compound to the organo aluminum compound is 1:(0.5-2.0):(0.5-3000).

6. The preparation method according to claim 1, wherein the molar ratio of the functionalized styrene to the rare earth complex is (50-10000):1, and the molar ratio of the styrene to the rare earth complex is (50-10000):1.

7. The method according to claim 1, wherein the temperature for the reaction is −60° C. to 80° C., and the time for the reaction is 0.1 hours to 48 hours.

8. The method according to claim 1, wherein the functionalized syndiotactic polystyrene has a syndiotacticity of no less than 90% and the repeating unit represented by formula (I) has a mole fraction w wherein $0\% < w \leq 100\%$.

9. The method according to claim 1, wherein the functionalized syndiotactic polystyrene has a number average molecular weight of $1 \times 10^4$ to $300 \times 10^4$.

* * * * *